(12) United States Patent
Ratias

(10) Patent No.: US 9,973,374 B1
(45) Date of Patent: May 15, 2018

(54) SYSTEMS AND METHODS FOR SYNCHRONIZING CONTENT AND INFORMATION ON MULTIPLE COMPUTING DEVICES

(71) Applicant: Cole Asher Ratias, San Rafael, CA (US)

(72) Inventor: Cole Asher Ratias, San Rafael, CA (US)

( * ) Notice: Subject to any disclaimer, the term of this patent is extended or adjusted under 35 U.S.C. 154(b) by 554 days.

(21) Appl. No.: 14/536,587

(22) Filed: Nov. 7, 2014

Related U.S. Application Data

(60) Provisional application No. 61/901,129, filed on Nov. 7, 2013.

(51) Int. Cl.
| | |
|---|---|
| *G06F 15/00* | (2006.01) |
| *G06F 13/00* | (2006.01) |
| *H04L 12/24* | (2006.01) |
| *G06F 3/0481* | (2013.01) |

(52) U.S. Cl.
CPC ............ *H04L 41/02* (2013.01); *G06F 3/0481* (2013.01)

(58) Field of Classification Search
CPC ............................. H04L 67/104; G06F 9/5072

USPC ................................. 715/738, 781, 776, 703
See application file for complete search history.

(56) References Cited

U.S. PATENT DOCUMENTS

| | | | |
|---|---|---|---|
| 9,112,936 B1* | 8/2015 | Poletto | H04L 29/0809 |
| 2009/0083288 A1* | 3/2009 | LeDain | G09B 19/06 |
| 2011/0202848 A1* | 8/2011 | Ismalon | G06F 17/3089 |
| | | | 715/738 |
| 2014/0282213 A1* | 9/2014 | Musa | G06F 3/0481 |
| | | | 715/781 |
| 2015/0248435 A1* | 9/2015 | Solheim | G06F 9/5072 |
| | | | 707/610 |
| 2016/0119413 A1* | 4/2016 | Antipa | H04L 67/104 |
| | | | 709/204 |

* cited by examiner

*Primary Examiner* — Kevin Nguyen
(74) *Attorney, Agent, or Firm* — VLP Law Group, LLP; Edward C. Kwok, Esq.

(57) ABSTRACT

Information can be synchronized between multiple computing devices by transmitting synchronization signals from a first computing device to a synchronization server and/or secondary computing device(s). The secondary device(s) can transmit mapped signals back to the synchronization server and/or other device(s) to provide feedback for this real-time or asynchronous peer-to-peer system. The system can also be used to virtualize and share sensors and output information between multiple devices.

102 Claims, 13 Drawing Sheets

SYSTEMS AND METHODS FOR SYNCHRONIZING CONTENT AND INFORMATION ON MULTIPLE COMPUTING DEVICES

CROSS REFERENCE TO RELATED APPLICATIONS

This application claims priority to U.S. Provisional Patent Application No. 61/901,129, filed Nov. 7, 2013, which is herein incorporated by reference in its entirety.

BACKGROUND

Computer systems have enabled the sharing of information on multiple computer screens. However, this sharing of information can typically mean mirroring of web pages on multiple computing devices. This mirroring on multiple computing devices might be useful for multiple people to view a single computer display. However, today many people have multiple computing devices that can share user data but may not function in a cooperative manner. What is needed is a system for synchronizing content across multiple computing devices where the multiple devices operate in a complimentary manner and may display different, related, or complimentary information.

SUMMARY OF THE INVENTION

Aspects of the present inventions related to synchronizing content across multiple screens and/or devices, including features of mapping of content between computing devices, synchronization, display and/or other processing across multiple screens and/or devices In an embodiment, the inventive system can synchronize content, data or information between multiple computing devices. The system can include a synchronization server that is in communication with a first computing device and a second computing device or device(s). The computing devices can be any type of computing device that can communicate with the synchronization server or the internet. For example, the first computing device can be a computer and the second computing device can be a smart phone. In other embodiments, the first and second computing devices can be any computing devices that have a processor and internet communication capabilities. The synchronization server can have a user database that stores information about each of the system users. This user information can include detailed information about the multiple computing devices associated with the user which in this example can include the first and second computing devices and can also include many other computing devices that are operated by or associated with the user as well as detailed information about or from the device(s) including screen resolution, GPS position of device(s), sensor data (including but not limited to: fingerprint sensor(s), temperature, barometer, gyroscope, etc), type of device(s) (including but not limited to television, smart phone, smart watch, internet-connected vending machine, etc).

In one exemplary implementation, there is provided a method for synchronizing content between computing devices that includes providing a synchronization server in communication with a first computing device having a first display and a second computing device(s) having a second display(s). The first computing device can emit a first synchronization signal to the synchronization server. The timing of the first synchronization signal can be based upon user interaction with the first computing device or the detection of a sensor coupled to the first computing device. For example, the first synchronization signal can be transmitted when the user uses a browser program to transmit a URL to a web server. User interaction with the first web server or synchronization server can cause the first computing device to transmit a first synchronization signal.

The first computing device and the synchronization server can determine the other user computing devices that are "online". In this context online can mean that the computing device is running a synchronization program. The online determination can be through a polling process facilitated by extensible messaging and presence protocol (XMPP). When a user device is on-line it can transmit a signal directly to the user's other devices or "related" devices as determined by the synchronization server ("related" devices may include but are not limited to devices within location proximity determined by synchronization server, or device(s) belonging to friend(s) of the user, etc.). Depending on if a device is online or offline, the synchronization server can transmit a message or data or signal to the other device(s) or related device(s), whereby the message, content of the message, data, and/or delivery method is determined by the synchronization server. By knowing the devices that are online or offline, the system can properly map the first synchronization signal to a second synchronization signal(s) transmitted through the appropriate type of notification delivery to the second synchronization device(s).

In an embodiment, the mapping is performed by the synchronization server which then transmits the second synchronization signal to the second computing device. However in other embodiments the mapping can be performed by the second computing device. In an embodiment, the mapping process can be performed through a mapping table by matching the first synchronization signal to the mapping table to determine the second synchronization signal(s) for the second computing device(s). The first synchronization signal can be mapped to a second synchronization signal which is processed by a second computing device.

In some configurations the mapping can be fairly straightforward. A first synchronization signal that is a URL may be mapped to a second synchronization signal that is the mobile-optimized version of the same URL. This mapping can result in the first computing device displaying the normal URL and the second computing device displaying the mobile-optimized URL. However, in other embodiments, the mapping formats can be substantially different. A first synchronization signal can be cursor position(s) on the screen of the first computing device which can be mapped to an image such as a JPG and/or an audio signal which can be output by the second computing device.

In some applications the first synchronization signal from the first computing device can be mapped to the same synchronization signal. Thus, the first synchronization signal can also be the second synchronization signal. This can be useful when a user is working on a document on multiple devices. For example, if a user is working on a text document using a word processing program on the first computing device, the first synchronization signal can be the text document. The text document first synchronization signal can be mapped to a second synchronization signal that is the same text document. The second computing device can respond to the second synchronization signal by opening the text document in the word processing program on the second device(s). The user can then switch to using the second computing device to continue to work on the text document.

When changes are made to the text document, the described process can be repeated with the second computing device emitting the edited text document as a third synchronization signal. Mapping can occur that transmits the edited text document as a forth synchronization signal back to the first computing device. Again, the mapping can occur at a synchronization server or on the first or second computing devices. Thus, the synchronization signals can be transmitted back and forth between the first and second computing devices (or more than two devices as well). This can allow continuous updating and refreshing of information so that the multiple devices are constantly synchronized with each other.

In some embodiments, the first and second computing devices can have different sensors or components that can provide enhanced functionality when the computing devices used in combination. For example, many smart phones now have finger print sensors that are used to prevent unauthorized use of the smart phone and access to stored data. In an embodiment of the present invention, the finger print sensor on the smart phone can be used as a security mechanism for a separate computing device. In an embodiment, the inventive system can be configured with a computer as a first computing device and a smart phone with a finger print sensor as a second computing device. The first computing device may want to access the user's private information through a website. The first synchronization signal from the first computing device can be the URL for a login page of the private information website. The URL of the login page can be mapped to a second synchronization signal that can be a finger print sensor prompt on the second device (including but not limited to a smart phone). As discussed, the mapping can be done by a synchronization server, or alternatively on the first or second computing devices, or downloaded to the first or second device which is then updated or changed by the synchronization server. The smart phone can respond to the second synchronization signal by displaying instructions for the user to touch the finger print sensor to complete the login of the user to the private information website on the first device. The user can then touch the finger print sensor and the second computing device can compare the input finger print to the stored finger print for the user. If there is a match, the second computing device will transmit a confirmation third synchronization signal to the first computing device and the user will be granted access to the private information through the website on the first device. Alternatively, if the fingerprint does not match, the second computing device can inform the user to try again or that the finger print is not a match and transmit the fingerprint mismatch message as the third synchronization signal to the first computing device.

This described finger print sensor system can be used for various other first computing device applications. For example, in an embodiment when a user first logs onto the first computing device, this login can be the first synchronization signal. The system can respond by transmitting the first synchronization signal to the second computing device that includes the finger print sensor (including but not limited to third-party finger print sensor device, smart phone with finger print sensor device, another desktop computer with finger print sensor device, etc). The smart phone can respond to the second synchronization signal by displaying instructions for the user to touch the fingerprint sensor to complete the login on the first computing device. If the device confirms that the fingerprint is a match, it will send a print match confirmation as the third synchronization signal to the first computing device which will complete the user login. If the fingerprint sensor input does not match the stored fingerprint, the second computing device can send a rejection signal to the first computing device to block the user login.

In other embodiments, the system may require information (including but not limited to password, personal identification number "PIN" or any other security information) in addition to the fingerprint confirmation to complete the login process. Thus, the second computing device can transmit a fingerprint match confirmation and the user's PIN as the third synchronization signal to the first computing device. The first computing device can complete the login if the first computing device determines that the PIN information provided is also a match ("match" as defined by mapping from synchronization server).

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and aspects of the innovations herein and, together with the description, help illustrate the principles of the present inventions. In the drawings.

DETAILED DESCRIPTION

Reference will now be made in detail to the inventions herein, examples of which are illustrated in the accompanying drawings. The implementations set forth in the following description do not represent all implementations consistent with the present inventions. Instead, they are merely some examples consistent with certain aspects related to the present innovations. Wherever possible, the same reference numbers will be used throughout the drawings to refer to the same or like parts.

Systems and methods consistent with innovations herein are directed to synchronizing content across multiple screens and/or devices, including implementations wherein various mapping, synchronization, display or other processing occurs. For example, innovations herein may relate to systems and methods for synchronizing content across multiple screens, where an input signal is sent from initial screen(s) to a synchronization server where it is mapped to the appropriate output signal, data or content for the secondary screen(s), and then further processed and/or sent to secondary screen(s) for display.

Figure 1:
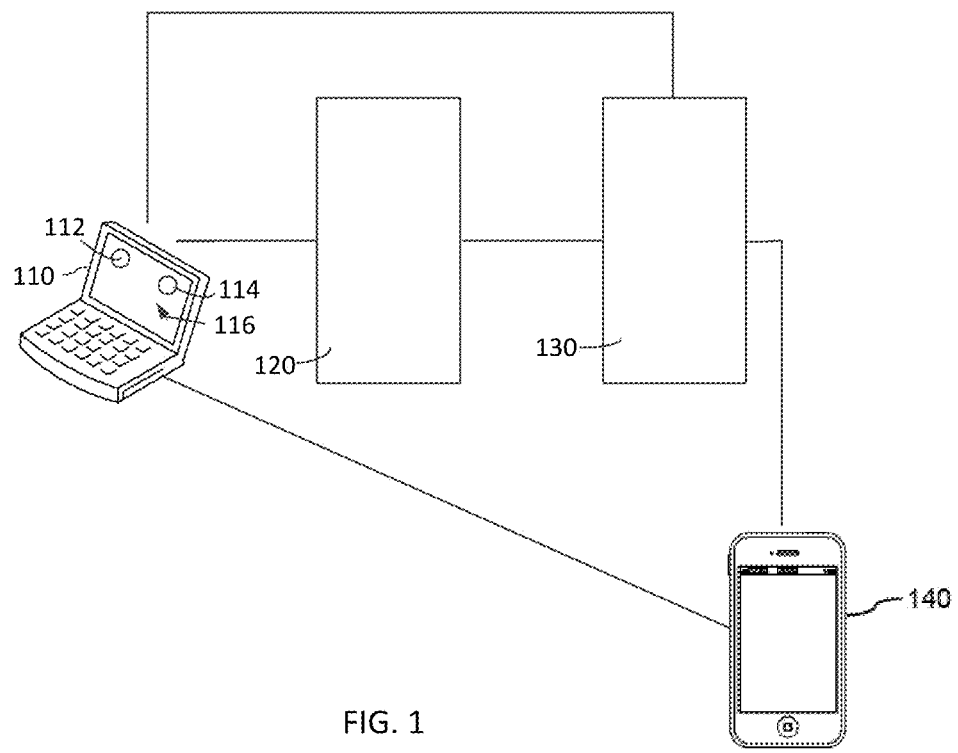
FIG. 1 is a block diagram of an exemplary system and features, consistent with certain aspects related to the innovations herein.

FIG. 1 illustrates a block diagram of an exemplary system and system features, consistent with certain aspects related to the innovations herein. In the illustrated embodiment, an environment is shown that includes: a first computing device 110, a web server 120, a synchronization server 130 and a secondary computing device 140. The first computing device 110 may be a computing device associated with a first user. The first computing device 110 can be a computing device such as a laptop, a tablet, a smart phone or the like. The first computing device 110 can communicate with a web server 120, etc. The web server 120 and/or the first computing device 110 can communicate with a synchronization server 130 which communicates with the second computing device 140. The second computing device 140 may be a mobile computing device associated or "related" with the first user, such as a smart phone, a smart watch, a television, a television within location proximity to the user or user's first computing device, a computer or any other computing device.

The user may enable the synchronization functionality in various different ways. With reference to FIG. 1, according to exemplary implementations disclosed herein, user activity on the first computing device 110 can include a wide variety of information such as navigation to web URL and particular data (including but not limited to GPS, cursor position on screen of first device) or actions of users may be provided (e.g., as URL1) to the web server 120. Such a web server 120 may enable the synchronization processing set forth herein, such as via site-wide scripts or by manual generation based on user action, like inclusion of Website functionality or plug-ins involving a "sync this" button 112 or a "Send to Phone" button 114 that can be actuated with a cursor 116.

In other embodiments, the user may enable the synchronization functionality by downloading a synchronization program to the first and/or second computing devices. In an embodiment, the synchronization program can be a separate program or an extension or plug in that is added to the web browser program running on the first computer device.

In some implementations, the synchronization signal may be automatically generated as a function of features of an App, a GPS signal, website URL, sensor signals or other signal inputs. However, implementations herein are not limited to this particular example shown, but instead may encompass a large variety of devices and/or behavior and functionality that users may synchronize.

When the synchronization feature is enabled, the inventive system can synchronize content, data or information between multiple computing devices. In the illustrated embodiment, the synchronization server 130 can be in communication with a first computing device 110 and a second computing device 140. The synchronization server 140 can include a user database that stores information about each of the system users. This information can include information about the user such as login identification, multiple computing devices associated or "related" with the user which in this example can include the first computing device 110 and second computing device 140. The stored user database information can also include many other computing devices that are operated by the user including but not limited to the data and/or sensors available on each device.

The user may use the first computing device 110, to access a web server by inputting a URL to a web browser program on the first computing device 110. The URL can be transmitted to the web server 120 that can respond by transmitting a web page associated with the URL to the first computing device 110 which is then displayed on the first computing device 110. If the first computing device has the synchronization software, the first computer device 110 can also transmit a first synchronization signal to the synchronization server 130. The synchronization server can respond by mapping the user's devices to different synchronization signals. This mapping can help the synchronization server 130 determine a second synchronization signal that is sent to a second computing device 140 as well as additional synchronization signals that can be sent to other devices.

The mapping process can include determining which devices are "on line" or "off line." In an embodiment, a process facilitated by extensible messaging and presence protocol (XMPP) which allows the synchronization server 140 to communicate with the user devices and determine if each device is on line or off line. For example, in an embodiment, the synchronization server can be a XMPP synchronization server that communicates with an XMPP user database. Each user can have his or her own unique entity within the XMPP database, for example: 123@getdoublevision.com. Each computing device associated with the user can have its own unique suffix that is added to the entity, for example the full identifier for the device can be, "123@getdoublevision.com/456", where "456" is the suffix that identifies a specific computing device associated with the user. All of the user's computing devices, including "related" devices, can be reached at the address 123@getdoublevision.com. "Related" devices may include but are not limited to devices within location proximity to user or the GPS location from user's device(s), device(s) belonging to friends of user, etc.

Whenever a new user's computing device comes online, it sends an "hello" message to 123@getdoublevision.com and this hello message is received by all of the user's computing devices that are also online at that moment as well as the XMPP synchronization server. The other devices and the XMPP synchronization server can also send a "hello" message back to the new computing device so that the new computing device will also have a list of all of the devices that are online. Thus, all of the user's online devices and the XMPP synchronization server maintain the online status of the user's computing devices at any time. Whenever a user's computing device goes offline, the XMPP synchronization server sends a "presence status" signal to all of the user's other online computing devices. The user's other online devices will then remove the computing device that just went offline from their online lists. In an embodiment, whenever a user's computing device needs to send data or synchronization signal to any of the user's other computing devices (including but not limited to "related"

device(s)), the device will check in its online list to see if there are any other devices online (except itself). If no other devices are online, the computing device will send the request to the XMPP synchronization server and the XMPP synchronization server may send a notification message to the other device(s) as determined by the synchronization server. For example if the device(s) is offline, the notification message will be sent through Apple's push notification servers to Apple devices, email or SMS or another notification to the offline devices so that the user can be informed to bring one or more of the other computing devices online. If there are other user devices that are online, the first user computing device will send the message to all other online devices that share the same unique entity prefix. In other embodiments the online or offline status of the user's devices can be determined by other methods.

If a device(s) is off line, the synchronization server 140 can send a push message to the device(s) asking the user to turn on the application on. In other embodiments, the system will determine alternative way to reach and/or notify users. For example, the notifications may include messaging a push server or sending an email or short message service (sms) text message or hand-off which is Apple Computer's version for notifying users on other user Apple devices. The user or the second computing device can respond to these notifications by running the synchronization application or viewing/opening the notification message in browser which can display synchronization signal.

When the on-line devices are determined, the synchronization server 130 can perform the mapping processing. The mapping may also occur on the first or second device(s), or the mapping may be downloaded on the device(s) and can be updated by the synchronization server. In an embodiment, the mapping processing can be illustrated with reference to Table 1. The mapping process is performed as a function of the input(s) or synchronization signal(s). In some implementations, the mapping process can include a default configuration that generates a mapped output signal that is an identical copy of the input signal. However, such output signals may also map to related or unrelated content as well, including specific mappings for client-side app(s). Moreover, the synchronization servers may apply additional logic and mapping, or saving/updating the mapping on each device e.g., so as to minimize frequency of automatically/manually synchronized signals based on many settings including user preferences for the desired synchronization.

TABLE 1

| Device 1 Computer | Device 2 Smart Phone | Device 3 Tablet | Device 4 Smart Watch | Device N |
|---|---|---|---|---|
| URL1 | Mobile URL1 | JPG1 | GPS1 | Thermal Sensor |
| URL1 + cursor movement | URL2 | Finger Print 1 | Sensor 2 | Motion Sensor |
| GPS2 | GPS3 | JPG2 | Audio 1 | Self Photo |
| URL3 | Finger Print 2 | Finger Print 3 | Audio 2 | E-Ticket |

If the synchronization server 130 receives a first synchronization signal from the first computing device 110, the system can search a mapping database for the corresponding synchronization signals for the other devices. For example, if the first synchronization signal is URL1, the mapping can result in a mobile version of URL 1 synchronization signal transmitted to device 2, JPG1 synchronization signal transmitted to device 3 (where JPG1 can be an image associated or related to URL1) and a GPS1 synchronization signal transmitted to device 4 (where GPS1 can be a GPS location associated or related to URL1). In response to these synchronization signals the second device which might be a mobile phone can display a mobile version of the URL 1, the third device which might be a tablet may display a photograph associated with the URL 1 and the fourth device may be a smart watch may download directions from current GPS location to a location which may be a store associated with URL 1.

If the user then moves the cursor to a specific location on the first computing device 110, this interaction can result in a different synchronization signal transmitted to the synchronization server 140 as illustrated in Table 2. The synchronization server 140 can respond by transmitting URL2 as a synchronization signal to smart phone device 2, actuate a finger print sensor on table device 3 and actuate a sensor on smart watch device 4.

In other embodiments, the synchronization signals can be transmitted based upon various triggers. For example, if the first computing device is moved to a specific location, the system can determine that the user is at a trigger location and the first computing device 110 can transmit GPS2 as a synchronization signal to the synchronization server 130. This location may correspond to a store location that has closed at the current time. The system can respond by outputting GPS3 which can be the location of another store that is currently open so that the user can make the necessary purchases. The synchronization server 130 can output a JPG2 to the tablet device 3 informing the user of the fact that the current location store is closed but the smart phone device 2 has directions to a store that is open. The system can also output an audio signal to the smart watch device 4 that can transmit an audio signal informing the user of the instructions displayed on the tablet device 3.

In some applications, the inventive system can be used for security purposes. For example, if the user goes to URL 3, this may require a login with secure user identification verification requirements. The synchronization server can respond by requesting a finger print verification from the biometric finger print sensor available on second device (ie smart phone). If the smart phone is not available, the system may request a fingerprint sensor verification from the tablet device 3. The system may also transmit an audio signal to the smart watch device 4 informing the user to bring the smart phone and/or tablet on line so that the finger print sensors can be used by the system, otherwise a message notification can be sent to the offline device(s) to remind the user to take action when they view or access the device(s).

In some implementations, the mapping may be provided by a mapping service provider, the user, the website owner, or a third party developer. The mapping does not necessarily need to be directly related to the input signal. According to alternate mapping processing, the input signal could be the GPS location on a smart phone, which is mapped on the synchronization server to a restaurant location and then that restaurant's photos are displayed on a corresponding mobile device or smart phone screen (or another screen). Alternatively, another mapping for the same input signal can be for alternative or "related" restaurant locations.

In a representative illustration, the first computing device 110 can be a computer having a web browser program. The first computing device 110 can transmit a uniform resource locator (URL) web address to the web server 120 which can respond to the URL by transmitting a web page back to the first computing device 110. For example, the first computing device 110 can transmit a URL for yahoo.com to the first computing platform 120 web server which can transmit the yahoo web page back to the first computing device 110. Upon initiation of the synchronization process, the user activity may then be transmitted as a first synchronization signal based on the initial screen(s) of the first computing device to the synchronization server 130. At the synchronization server 130, various processing may occur based on the first synchronization signal, including performing processing of the first synchronization signal against a mapping structure (e.g., mapping table, scheme or information) as a function of data available to the synchronization server 130 or otherwise embodied within the mapping structure. Here, for example, the first synchronization signal may be mapped to appropriate output content, such as content according to the mapping structure and/or suitable for the second computing device screen(s). Further processing may be performed at the synchronization server 130 to process and provide the output content for suitable use by the second computing device 140 and/or display on a second computing device screen(s).

Moreover, consistent with the present innovations, various synchronization processing may also work in reverse. According to systems and methods herein, a user's interaction with the second computing device 140, such as sensor inputs or touch screen inputs on the screen of the second computing device 140, may be synchronized back to the initial device 110 and screen. In certain implementations, for example, user interaction with the output on the secondary device 140 is utilized to generate another input signal, which is then sent to the synchronization server where mapping processing occurs, and a corresponding output is sent back to the initial device 110 or screen.

Figure 2:
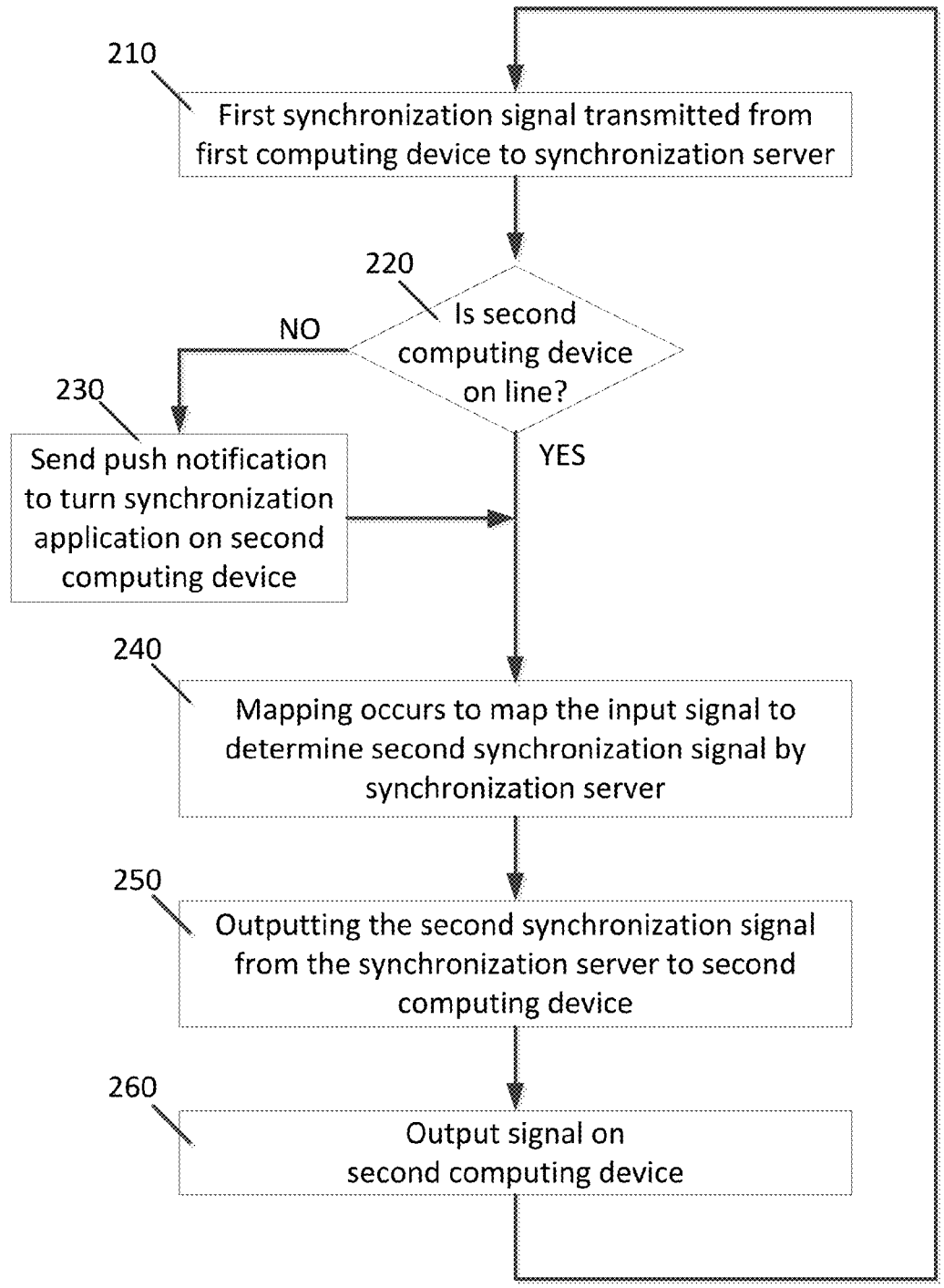
FIG. 2 is a flow diagram illustrating exemplary synchronization and mapping processing, consistent with certain aspects related to the innovations herein.

FIG. 2 is a flow diagram illustrating exemplary synchronization and mapping processing, consistent with certain aspects related to the innovations herein. An action is taken by a user or an event occurs that is configured to initiate a first synchronization signal from the first computing device to the synchronization server 210. The action can be an express action by the user such as inputting a URL into a web browser or automatically in response to a user action such as movement of a curser control. In other embodiments, the first synchronization signal may be generated via a browser extension, such as an add-on or plug-in for Chrome or Safari or Firefox, etc., via a "Send to Phone" or a "Sync This" button on a developer's webpage, via a site-wide script on a developer's webpage, or via any other detectable triggers that can be based upon user actions, sensor data (GPS position, time/date, temperature, gyroscope sensors, touch-screen sensors or gestures, etc.). All of these actions can result in a first synchronization signal being transmitted to the synchronization server.

The synchronization server can determine which second computing devices are on line 220. The on line status can require a synchronization software application be running on the second computing device. If the second computing device is not on line, the synchronization server can send a notification message as determined by the synchronization server to be an Apple Push Notification (or Hand-Off, which is Apple's product for notifying users on other devices) instructing the user to turn on the synchronization software application 230. In other embodiments, the system will determine alternative way to reach and/or notify users. For example, the notifications may include messaging a push server or sending an email or short message service (sms) text message or Hand-Off which is an Apple software product for notifying users on other user devices. The user or the second computing device can respond to these notifications by running the synchronization application, or directly viewing the signal in the default browser, within a native client-app with or without the synchronization developer kit (SDK), or downloading the synchronization app to the device.

The first synchronization signal can then be mapped by the synchronization server, at 240. As explained further above and below, the mapping by the synchronization server may include identifying the first synchronization signal and determining a corresponding synchronization signal(s) for other device(s). The second synchronization signal is then provided as output, at 250. The second synchronization signal may be provided to the secondary device(s) 140 via SMS, via push notification (e.g., from the synchronization application, or a software application running on the second computing device with synchronization software developer kit (SDK)). The second computing device can respond to the second synchronization signal by outputting an output signal. The output signal can be any type of signal output through an output device on the second computing device. For example, the output signal can be a visual signal such as a web page that is output through a visual display of the second computing device. Alternatively, the output signal can be an audio signal that is output through a speaker in the second computing device. The described process can be repeated so that the first synchronization signals are constantly being transmitted from the first computing device to the synchronization server and the second computing device is continuously receiving updated second synchronization signals from the synchronization server and outputting revised output signals based upon the first synchronization signals.

In some embodiments the synchronization process can be automated. One exemplary of automatic sync processing may be understood in connection with a user searching for additional information regarding an establishment, such as a restaurant. With reference to FIG. 1, a user may be utilizing the first computing device 110 to look at a restaurant on Yelp.com. Here, the user clicks through to a specific business web page using a browser program, where the system may be configured such that the Yelp URL to that business page is processed as the automated first synchronization signal. In this example, the user's smartphone may be set up as the second computing device. Further, according to implementations herein, one or more of the following features or sequence of these features may be configured to occur. The system may be configured such that the second computing device 140 runs the synchronization software application, which displays same Yelp URL (given default mapping in this example, i.e., display of the same URL via the client-side Sync app). Alternatively, the system may be configured such that the mobile version of the same Yelp URL is displayed on the second computing device 140. Here, for example, the mapping structure may map the URL as the first synchronization signal to a mobile version of the URL as the second synchronization signal for the second computing device 140. The system may also be configured such that a map app or the synchronization application provides an output that displays directions to the business. Here, for example, the mapping structure may utilize mapping to 'deeplink' directions to the business, e.g., in a Maps app. The system may be configured to provide an App Store page and associated link(s) as the output signal, directing the user of the secondary device 140 to download the Yelp app, if needed.

Here, for example, the mapping structure may map the URL to the App Store page for the Yelp app (URL2) suitable for their mobile device, again, as a function of whether or not the user's second computing device 140 is already running the desired app. The system may be configured to provide the Yelp app, itself, as the output signal, e.g., to display the same business in the app on the user's smartphone. Here, for example, the mapping structure may utilize mapping to 'deeplink' information of the article in Yelp's app. The system may be configured to provide the Yelp app, itself, specifically display of a checkout page in the app as the output signal. Here, for example, the mapping structure may utilize mapping to 'deeplink' information of the checkout purchase page within Yelp's app. Finally, the system may be configured to provide customized mapping in any other number of scenarios. In one instance, for example, the mapping structure may be utilized to map input signals to output anything including other client side apps, related or unrelated. Moreover, according to various implementations herein, the input signal may be automatically updated with each URL that the user navigates to, and the secondary screen continues to update as well in realtime, or asynchronously and can serve as notifications or reminders.

User-Directed Synchronization

In an embodiment, the user of the computing devices can control the synchronization process. If a user is reading an article on the website techcrunch.com, and clicks the "Sync This" button placed there by the website developer staff above each article, the 'input' data attached by website developer to the "Sync This" button is the input signal (likely the URL to that article) and the mobile device is the secondary screen which then automatically displays:

- the Sync app itself which displays same Techcrunch URL (default mapping—to display URL in clientside Sync app),
- the mobile version of the same article (mapped to mobile version displayed in clientside Sync app),
- the App Store page to download the Techcrunch app (mapped to their mobile app, if user doesn't have the app already),
- the Techcrunch app itself which displays the same article in the app (mapped to 'deeplink' the article in Techcrunch's app),
- the Techcrunch app itself which displays a checkout page in the app (mapped to 'deeplink' checkout purchase page in Techcrunch's app), or
- any other number of scenarios, input signals can be mapped to output anything including another clientside app (related or unrelated)

Implementations herein may also include or involve two-way synchronization. For example, all illustrations herein may also work in reverse, where secondary screen and display become the input signal, which is sent to synchronization servers to be mapped and then sent to initial screen(s).

According to another illustrative example, the user can be editing a Word document on desktop computer (primary screen/device), the user can enable the synchronization with his smart phone (secondary screen/device), wherein the input is the word document that is mapped to the font controls (output). As such, the user's clicking on font controls (output) sends the appropriate commands to the synchronization server(s) and then mapped to and applied in the word document, and vice versa.

Figure 3:
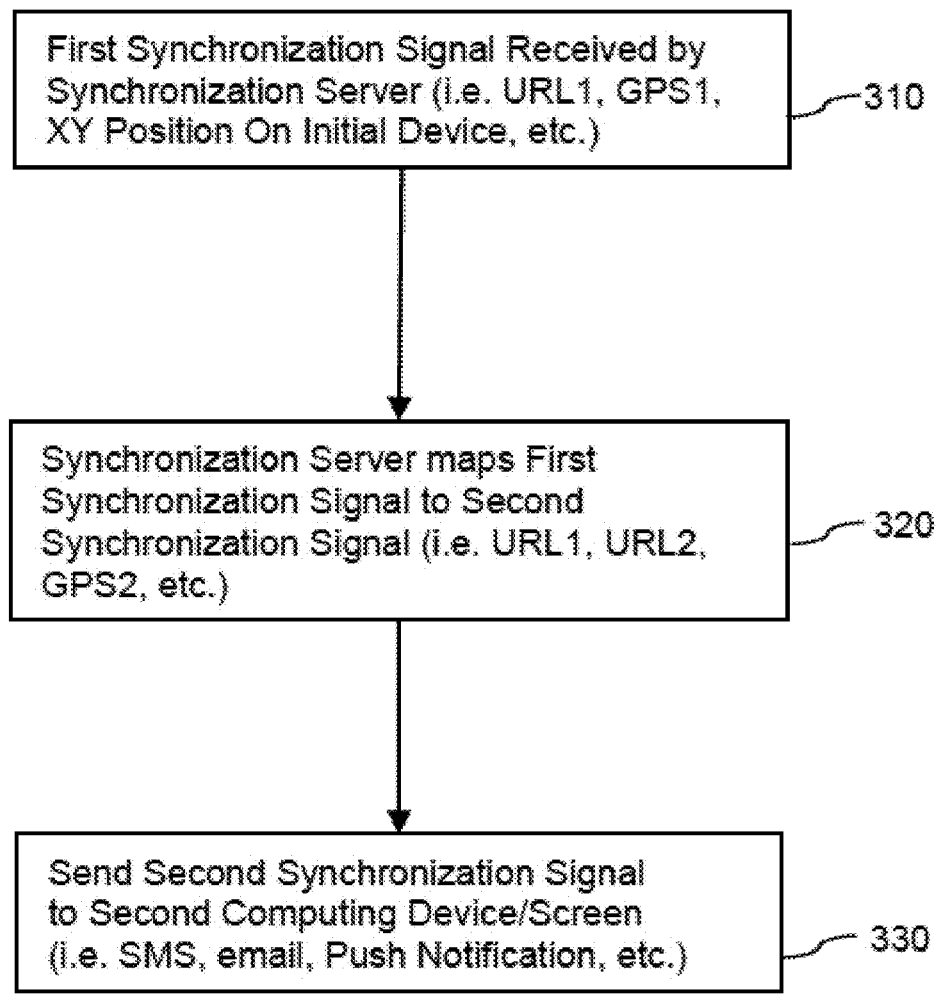
FIG. 3 is a flow diagram illustrating further exemplary synchronization and mapping processing, consistent with certain aspects related to the innovations herein.

FIG. 3 illustrates a flowchart of a further exemplary synchronization and mapping processing, consistent with certain aspects related to the innovations herein. This embodiment illustrates the different types of actions that can be used to automatically trigger the first synchronization signal to the synchronization server 310. The user can input URL1 to a web browser which can trigger the first computing device to transmit URL1 as the first synchronization signal to the synchronization server. Alternatively, the user may go to a specific location which can be detected by a GPS sensor on a first computing device which can trigger the GPS location as the first triggered synchronization signal.

The user interaction with the first computing device may also result in a triggered synchronization signal. For example, a user may move a cursor or touch a specific location on the first computing device display which can cause the first computing device to transmit the X, Y position on the first computing device screen. The user interface can detect the position of the cursor as matching a trigger condition resulting in a first synchronization signal being transmitted to the synchronization server. In other embodiments, any other sensor signals or user actions can be used to trigger the transmission of the first synchronization signal to the synchronization server.

The synchronization server maps the first synchronization signal to a second synchronization signal(s) 320. The synchronization server may access user data and identify the computing devices that are associated or "related" with the user. The mapping functionality can be represented by a table, such as Table 1 above. The mapping table can inform the synchronization server what the second output synchronization signal(s) should be transmitted to the other computing devices. The synchronization server can search the first column of the table and identify the matching first synchronization signal. From the first synchronization signal in the first column, the corresponding second synchronization signal(s) are aligned and listed horizontally. As discussed earlier, the second synchronization signal(s) can be the same or different types of signals. For example, a first synchronization signal that is a URL, can result in a second synchronization signal that can also be a different URL or any other type of signal such as a JPG, GPS, Sensor request, etc. The mapping can be configured by user preferences, web server preferences (developer preferences), the synchronization server, or even locally on the device which can update the synchronization server, or be updated by it as well.

Once the mapping has been performed and the second computing device(s) have been identified, the system can transmit the second synchronization signal(s) to the second computing device(s) 330. The second synchronization signals can be transmitted through various mechanisms including: SMS, email, push notifications, or directly to the Sync app/SDK if the device is "online" etc. The second synchronization signal can include output information or data as well as the output device on the second computing device. The second computing device can run a synchronization application that can interpret the second synchronization signals and produce an output signal based upon the second synchronization signal(s). For example, URL1 can result in the second computing device browser displaying the corresponding mapped URL2. In other embodiments, a second synchronization signal can result in the JPG1 image being displayed (which may be related or associated with URL1, or possibly completely unrelated). Alternatively, a GPS second synchronization signal can result in the directions to the GPS location being displayed. An audio second synchronization signal can result in the second computing device emitting the audio output signal.

Figure 4:
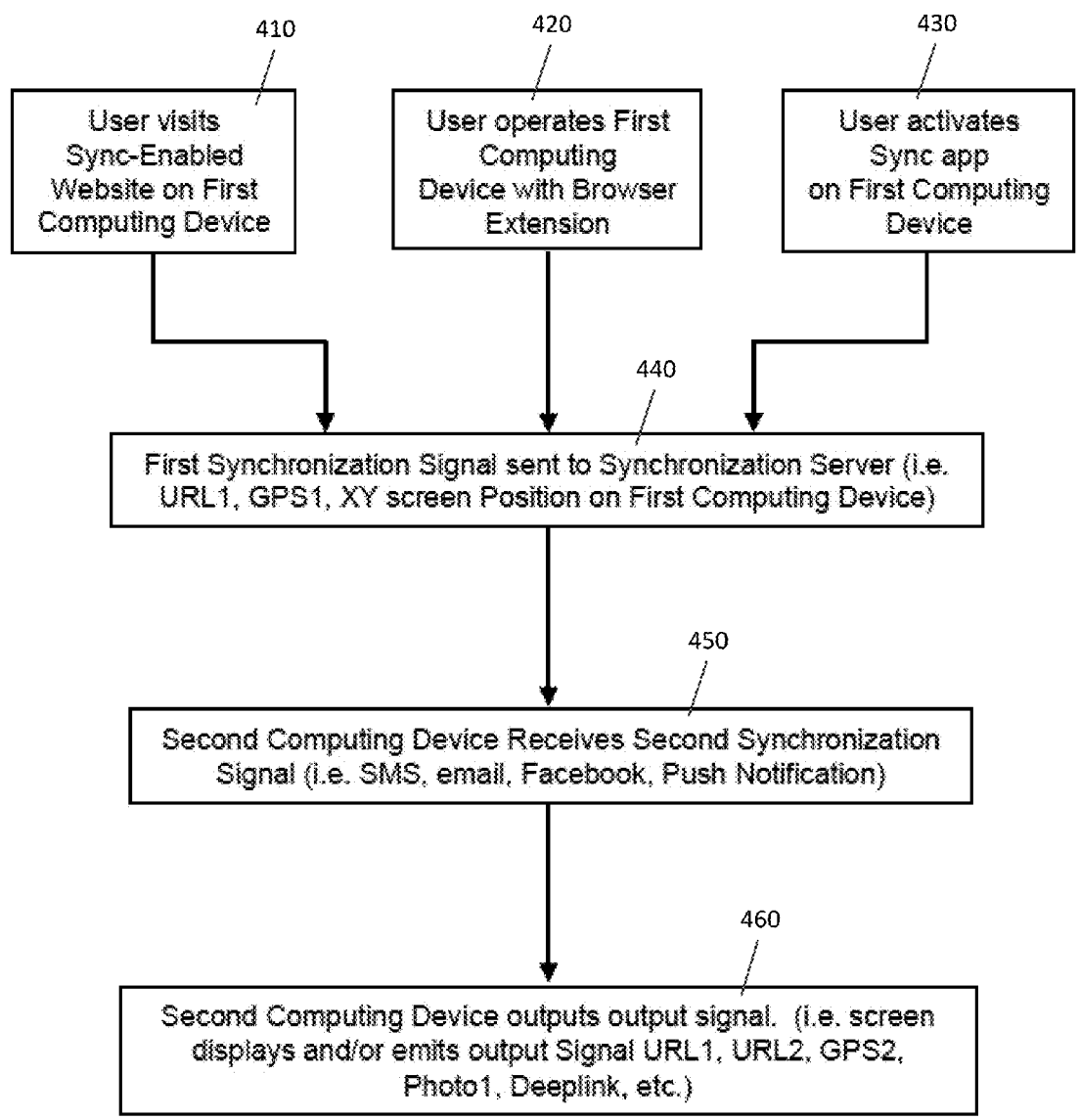
FIG. 4 is a flow diagram illustrating additional exemplary synchronization and mapping processing, consistent with certain aspects related to the innovations herein.

With reference to FIG. 4 a flowchart is illustrated showing additional exemplary synchronization and mapping processing, consistent with certain aspects related to the innovations herein. The flowchart illustrates various initial steps 410, 420 and 430 for actuating the synchronization process. In a first example, a user can use a first computing device with a browser program to visit a synchronization-enabled website 410. In a second example, a first computing device can have a web browser that includes a synchronization browser extension that can automatically send a first synchronization signal from the first computing device to the synchronization server based upon user interaction with the web browser or sensor signals from the first computing device 420. In a third example, the first computing device can run a synchronization application that can automatically send a first synchronization signal from the first computing device to the synchronization server based upon user interaction or sensor signals detected by the first computing device 420.

Any of these steps 410, 420 and 430 can cause the first synchronization signal to be sent to the synchronization server 440. As discussed, the first synchronization signal can include URL, GPS, X-Y cursor position, or any other information or data that can be used or mapped by the synchronization server. The synchronization server maps the first synchronization signal and transmits a second synchronization signal to a second computing device 450. The second computing device receives the second synchronization signal 460 which can be in the form of a SMS, email, Facebook notification, Apple push notification, Google Android push notification, etc, or directly to Sync app if device is "online". The second computing device can then process the second synchronization signal and output a corresponding output signal 470. For example, if the second synchronization signal includes a URL, a web browser on the second computing device can display the web page associated with the URL. If the second synchronization signal includes GPS data, the second computing device can output directions to the GPS location. If the second synchronization signal includes a photo, the second computer device can display the photo.

The described systems and methods can relay information from the user's initial screen(s) on a first computer device to the synchronization servers, map that information, and sends associated outputs to the secondary screen(s) or other output devices on a second computing device (or third, forth, etc.). Further, according to implementations specific to Apple mobile devices (such as iPhone, iPod Touch, iPad), Apple's "Push Notifications" may be the functionality used to "send" the notification message with synchronized content or data to the secondary device(s)/screen(s). Further, implementations of the Apple Push Notification system may alert the user if the synchronization app isn't already running on the computing device. The push notification can inform a user that there's an action to take, (such as downloading and/or opening the synchronization application to view or access the synchronized content/data) or if the synchronization application is open and running then automatically display the desired related information or data.

Browser Extensions

With respect to implementations directed to a user browsing the web, a plugin extension to a browser may be utilized in order to automatically generate the input signal. After installing the extension, the plugin may be configured to ask the user (once) for login information, such as their mobile-side app login and mobile phone number, Facebook login, or email, a login for any mobile-side app that uses the sync SDK, or the like. The user's data is then sent to the synchronization servers, which can then send an SMS text message or email to the user's mobile device with the sync signal which can be a link to download a mobile app, or the web server developer's own mobile app but with an embedded or provided SDK enabling the client-side synchronization. From then on, systems and methods herein may maintain a mapping between the user's browser session (initial screen/device) and the user's mobile device (secondary screen/device). Here, for example each time the Chrome Extension detects a change in the URL or change in which browser tab is currently active, it sends that current URL to the synchronization servers (as the input signal), then the synchronization servers perform any necessary mapping and send that information/data to the clientside mobile Sync app (or website's own mobile app with the sync SDK, which enables the clientside synchronization). Matching extensions are created for the other browsers (e.g. Firefox, Safari, Internet Explorer, etc) as well.

Client Site-Wide Script

The browser implementations above may require users to have explicitly downloaded and installed the appropriate extension for their browser, which websites can't count on. Accordingly, other implementations may be utilized wherein webpage script(s) (a small amount of JavaScript code) may be embedded into their webpages to enable Sync by automatically generating the input signal based on the URL the user is viewing or other signals generated by the developer, which is then sent to the synchronization servers. Again, such script can send any input signal as defined by the developer to be the current URL and additional information or data about the user including but not limited to X-Y screen position, user data like name) to the synchronization servers (as the input signal). Websites will have the ability to specify desired mappings between the input signal and the desired content and/or behavior (output signal) that is then displayed on the user's secondary screen(s).

Client "Sync This"/"Send to Phone" Button

When more information than just the current URL is required for the input signal, websites can integrate an embeddable button-widget, similar to Facebook's "Like This" button. The "Sync This"/"Send to Phone" button can be easily set up to send the desired content/data to the synchronization servers (as input signal) when the user clicks on it.

For example, eBay.com shows many products on each page but by adding the "Sync This" button next to each product, users can click the specific product they wish to synchronize to their secondary screens. Each "Sync This" button has its own input signal and mapping (specified by webpage developer), so the "Sync This" button above Product_1 can map to display the mobile version of the Product_1's URL on the second device(s), while another button above Product_2 can map to display the purchase checkout page on the second device(s), or can map to display image(s) from Product_2 on the second device(s), etc. The configuration of the "Sync This" actuation and other mapping functionality and processing can depend on the predetermined mapping configuration used by website developer or mapping service provider.

Service Running in Background

In addition to the extensions for all major web browsers, an embodiment of the present invention can also include a synchronization service that runs in the background of the initial screen, which requires the user to install the service on the initial screen (App on iOS, Mac App on OSX, .exe program on Windows, or third Party Apps with Sync SDK, etc). In an embodiment, the synchronization service provides an API for developers to integrate their own app specific commands (mappings), without dealing with communication between the initial screen and the secondary screen(s). This synchronization service can provide the communication between the initial screen and the secondary screen sync device(s).

In an embodiment, the Client Site-Wide Script and "Sync This"/"Send to Phone" button can identify the user and encourage the user to download the client-side Sync app (or to use an app which includes a client-side SDK enabling the sync) to the second computing device(s). In an embodiment, the synchronization system may have a registration process that can ask for a user's personal and device identifications and mobile phone number which can be stored in the user database on the synchronization server. However, In an embodiment, before requesting the user's phone number and sending an SMS text message with a link to the client-side app, implementations herein may be configured to try to identify other mobile computing devices on his local area network or possibly connected via Bluetooth or iBeacon and send them a Push Notification to see if they already have the synchronization client-side app installed.

If a user doesn't wish to provide a mobile number (or is using an iPod Touch or iPad without a "phone number"), an alternative way is required to send the download link for the synchronization client-side Sync app to the user's mobile device. Several alternatives include: Providing very short and easy-to-type download URL, Sending a Sync app download URL via email, Facebook, Twitter, or SMS. This user information can then be stored in the user database on the sync server.

Figure 5:
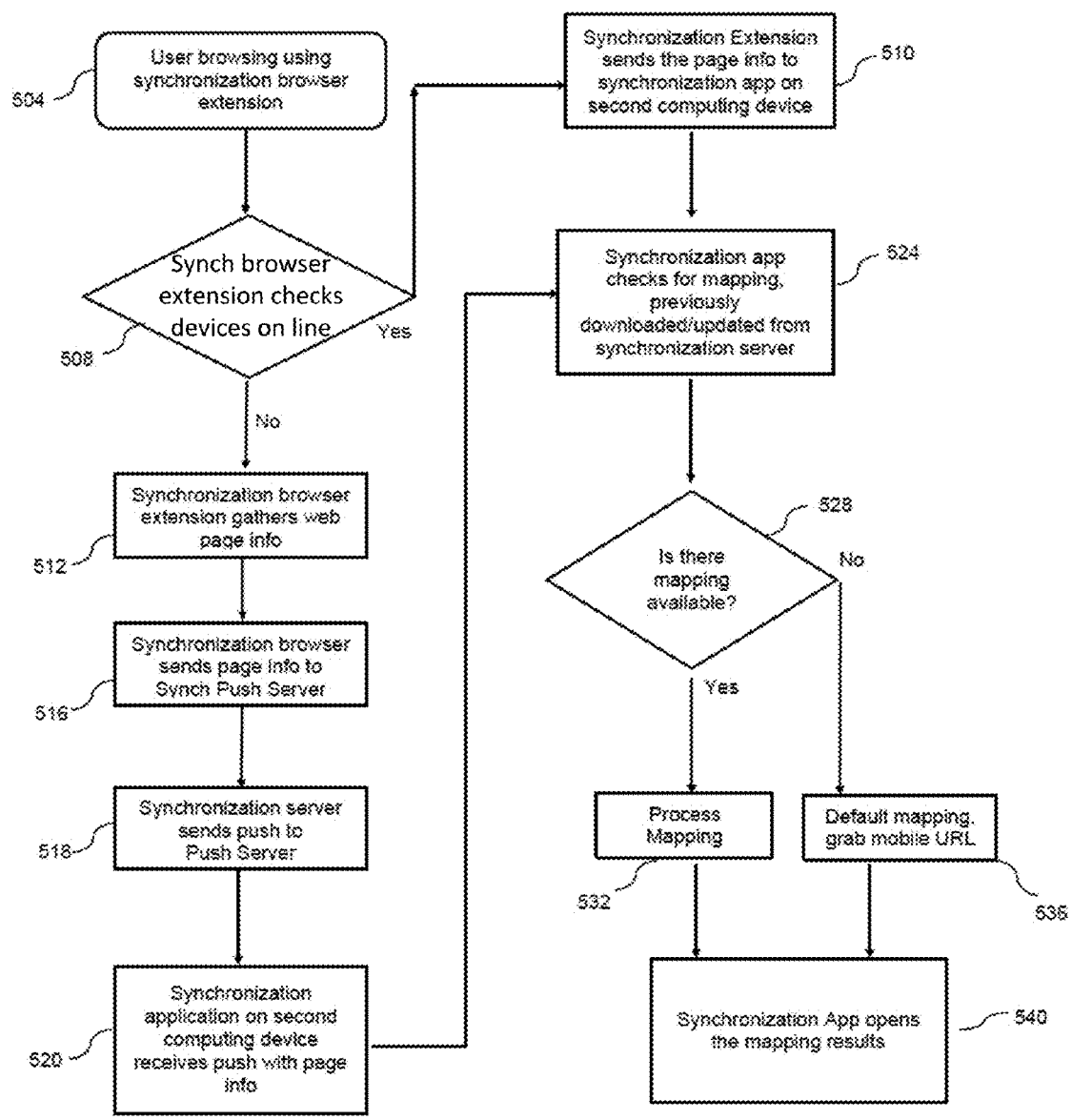
FIG. 5 is a flow diagram of illustrative synchronization and mapping processing for an exemplary URL-URL implementation, consistent with certain aspects related to the innovations herein.

With reference to FIG. 5 a flow chart is illustrated showing an embodiment of device synchronization and mapping processing for an exemplary first URL on a first computing device in synchronization with a second URL on a second computing device. A user can be operating a first computing device having a web browser program that includes a synchronization extension 504. In this embodiment, the synchronization browser can determine which of the other user's computing device(s) or "related" device(s) are online 508 as described above. If another computing device is detected to be online, the synchronization extension on the first computing device can send the web page information to the synchronization application on the second computing device 510.

If no other user associated computing devices are online, the synchronization browser extension can gather information and data based upon the current web page that the user is viewing on the first computing device 512. In an embodiment, the synchronization browser extension can send the page information or other data to the synchronization push server 516. Alternatively, the page information or other data can be sent from the first computing device to the synchronization server and the synchronization server can send the page information or other data to the synchronization push server. The synchronization push server can send a push message or signal to the second computing device(s) 518. The push signal can cause the second computing device to go online if the user opens and/or responds to the push message. The synchronization application on the second computing device can receive the push signal with the page information and additional data from the first computing device 520.

From step 510 or step 520, the synchronization application can check for mapping previously downloaded or updated from the synchronization server 524. The synchronization application can also determine if any mapping for the first synchronization signal is available 528. If mapping is available, the synchronization application can perform the mapping of the first synchronization signal to produce a second synchronization signal 532. Alternatively, the mapping of the first synchronization signal to produce a second synchronization signal can be performed by the synchronization server. If mapping for the first synchronization signal which can be a URL is not available, the application program may apply a default mapping procedure where the second computing device is a smart phone and the second synchronization signal is mapped by default to a mobile version of the URL 536. The synchronization application on the second computing device can then open the second synchronization signal from the mapping results and produce an output signal corresponding to the mapped second synchronization signal 540. For example, if the second synchronization signal is a mobile URL, the second computing device can display the mobile URL.

Figure 6:
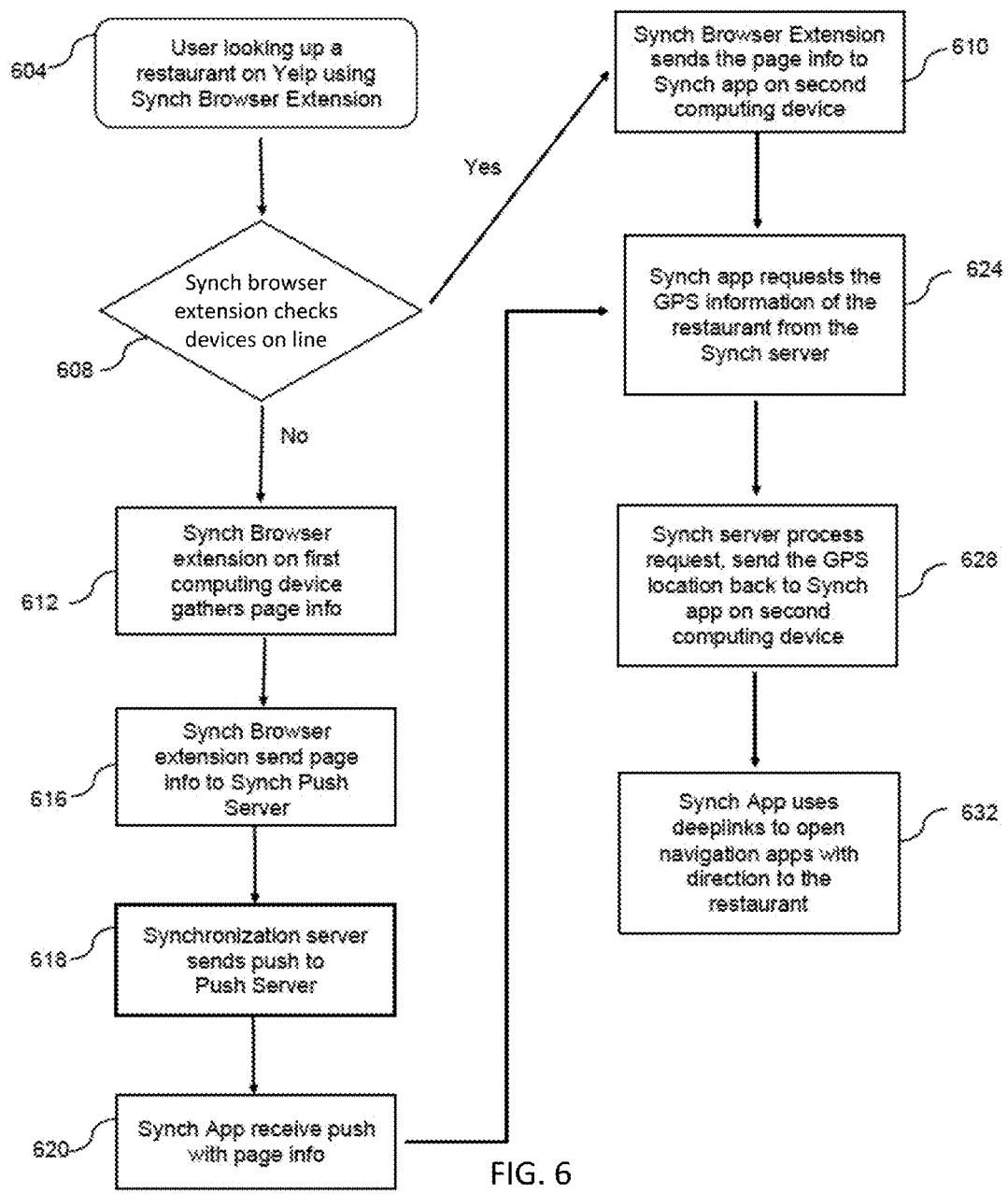
FIG. 6 is a flow diagram of illustrative synchronization and mapping processing for an exemplary URL-GPS implementation, consistent with certain aspects related to the innovations herein.

FIG. 6 illustrates another example of a flowchart of a possible synchronization and mapping process in a URL-GPS implementation. In this example, the user may be using a first computing device with a web browser having the synchronization extension to look up a restaurant on a restaurant review website 604. The synchronization browser extension can check for other user device(s) or "related" devices that are online 608. If other user or "related" online device(s) are detected, the synchronization browser extension can send the restaurant review web page information to the synchronization application on the second computing device 610. This information or data can include data or link to the specific restaurant that is being seen by the user thorough the restaurant review website on the first device.

If no other user associated computing devices are online, the synchronization browser extension can gather web page information and other data based upon the current web page that the user is viewing on the first computing device 612. In an embodiment, the synchronization browser extension can send the page information and data to the sync push server 616. The synchronization push server can send a push message or signal to the second computing device(s) 618. The push signal can cause the second computing device to go online. The synchronization application on the second computing device can receive the push signal with the page information and data from the first computing device 620.

From step 610 or step 620, the synchronization application on the second computing device can request GPS location from the synchronization server 624. The synchronization server can process the request and send the GPS location information which can include a deeplinks to the synchronization application (or third party application with Sync SDK) on the second computing device 628 (alternatively if GPS location is not available, the sync server can request GPS as another input signal going to the chrome extension and/or webserver (if they have integrated the Sync site-wide script). The synchronization application can receive the deeplinks and use the deeplinks to open a Maps or Navigation application on the second computing device which provides directions to the restaurant to the user 632 (or take user to download the Maps/Navigation apps if they do not exist on the second device(s)).

Figure 7:
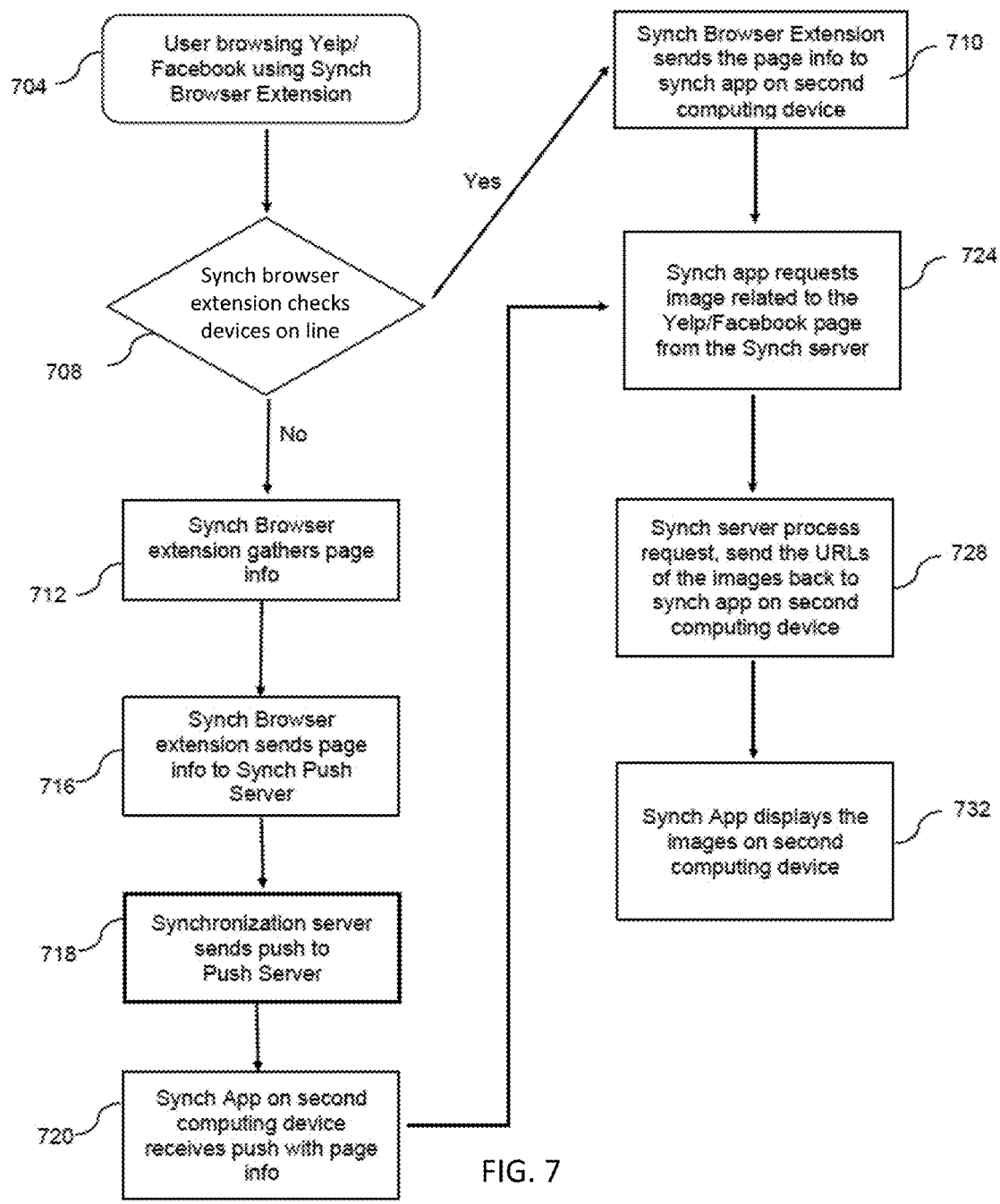
FIG. 7 is a flow diagram of illustrative synchronization and mapping processing for an exemplary URL-JPG implementation, consistent with certain aspects of the innovations herein.
Figure 8:
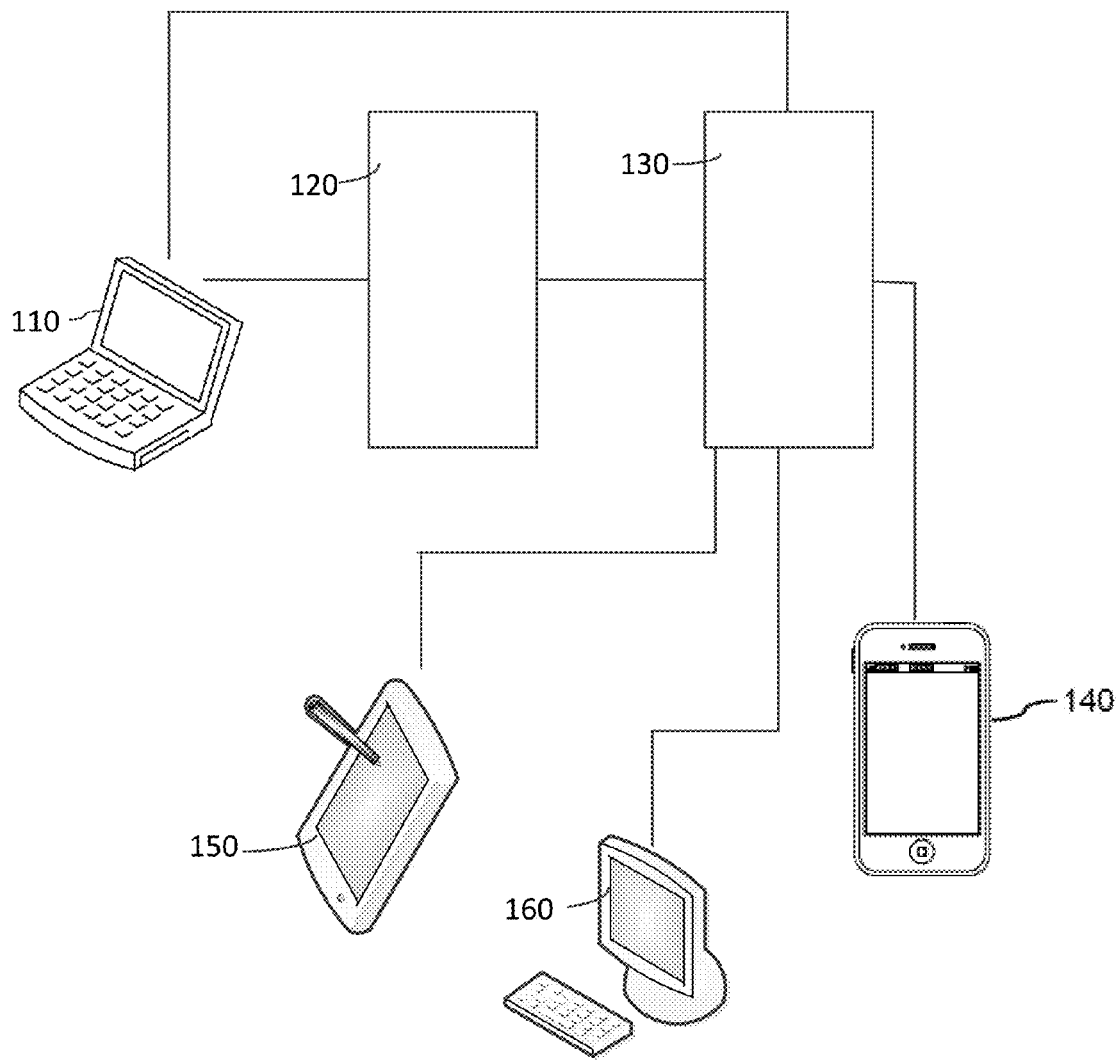
FIG. 8 is a block diagram of another exemplary system and features, consistent with certain aspects related to the innovations herein.

FIG. 7 illustrates a flow chart for synchronization and mapping processing for an exemplary URL-JPG implementation. In this embodiment, the user can be viewing a website with a browser having the synchronization extension 704. In this example, the user may be viewing a webpage from Yelp or Facebook. The synchronization extension running on the browser can check for other user devices that are online. If other user online devices are detected, the synchronization browser extension can send the Yelp or Facebook web page information to the synchronization application on the second computing device 710.

FIG. 7 illustrates a flow chart for synchronization and mapping processing for an exemplary URL-JPG implementation. In this embodiment, the user can be viewing a website with a browser having the synchronization extension 704. In this example, the user may be viewing a webpage from Yelp or Facebook. The synchronization extension running on the browser can check for other user devices that are online. If other user online devices are detected, the synchronization browser extension can send the Yelp or Facebook web page information and/or data to the synchronization application on the second computing device 710.

If no other user associated computing devices are online, the synchronization browser extension can gather web page information based upon the current web page that the user is viewing on the first computing device 712. In an embodiment, the synchronization browser extension of the first computing device can send the page information and additional data to synchronization server which can then send this information to the sync push server 716. The synchronization push server can send a push message or signal to the second computing device(s) 718. The push signal can cause the second computing device to go online if users open the push notification message. The synchronization application on the second computing device can receive the push signal with the page information from the first computing device 720.

From step 710 or 720, the synchronization application can request an image related to the Yelp or Facebook webpage from the synchronization server 724. The synchronization server can process the request and send URLs for the images as second synchronization signals back to the synchronization application on the second computing device 728. Alternatively, the synchronization server can send the actual images possibly in JPG format back to the synchronization application (or the URL of the image(s)). The synchronization application (or third party application with the Sync SDK) can process the URLs or JPGs and display the images on the second computing device 732.

In other embodiments, the inventive system can be used to synchronize information or data on multiple computing devices to improve the functionality and user experience. In an example, a first synchronization signal from the first computing device can be a document that a user is producing using a computer program. In this embodiment, the first document synchronization signal can be mapped to the same second document synchronization signal. Thus, the first synchronization signal can be the same document as the second synchronization signal.

This can be useful when a user is working on a document on multiple computing devices 110, 140, 150, 160. For example, if a user is working on a text document using a word processing program on the first computing device 110, the first synchronization signal can be the text that is being added and edited by the user within the document. The first synchronization signal can be the input text which is mapped to a second synchronization signal that is the same input text. The second computing device 140 can respond to the second synchronization signal by opening the input text in a native program. For example, if the second computing device 140 has the same or a mobile version of the word processing program used to create the input text on the first computing device 110, the second computing device 140 can display the input text in the word processing program running on the second computing device 140. The first synchronization signals can be transmitted whenever text is added, deleted or edited. Thus, the revised input text can be immediately displayed, as it is being input and edited on the second computing device 140. Thus, the user can then switch from working on the document on the first computing device 110 to using the second computing device 140 to continue to work on the text document. Alternatively, the synchronization signal can also be the plain-text and formatting data that make up the text document so the developer can rebuild the document on the secondary device and/or keep track of state, version and any additional data that make up the "text document" in its entirety.

When changes are made to the text document by the second computing device 140, the described process can be repeated in reverse. The second computing device 140 can emit the text document as a third synchronization signal. Mapping can occur that transmits the edited text document as a forth synchronization signal which is transmitted back to the first computing device 110. Again, the mapping can occur at a synchronization server 130 and/or on the first computing device 110 or the second computing device 140. The text can be displayed on the first computing device 110 as it is input, deleted and/or edited on the second computing device 140. Thus, the synchronization signals can be transmitted back and forth between the first and second computing devices as the user operates the first and second computing devices 110, 140.

In yet another embodiment, three or more computing devices can be used for the described process. In this example, the mapping of input text from the first computing device 110 can be transmitted to two additional user computing devices 140, 150, 160 (or "related" devices). In this embodiment, the system can determine the other computing devices 140, 150, 160 that are online and the mapping can be the input text to all other computing devices, as represented by Table 2 below.

TABLE 2

| Device 1 | Device 2 | Device 3 | Device 4 | Device N |
|---|---|---|---|---|
| Laptop | Smart Phone | Tablet | Desk Computer | . . . |
| text + data | text + data | text + data | text + data | text + data |

When text is input, the first computing device 110 can transmit the text as the first synchronization signal to all of the other computing devices 140, 150, 160 (Device 2-Device N). The other computing devices 140, 150, 160 can display the text and data as it is input and the user can then work on the same input text and data through any of the other computing devices 140, 150, 160. This can allow continuous updating and refreshing of information so that all text input through any of the computing devices 110, 140, 150, 160 is constantly synchronized with each other.

In some embodiments, the first and second computing devices can have different sensors or components that can provide enhanced functionality when the computing device(s) are used in together. For example, many smart phones now have finger print sensors that are used to prevent unauthorized use of the smart phone and access to stored data. In an embodiment of the present invention, the finger print sensor on the smart phone can be used as a security mechanism for a separate computing device. In an embodiment, the inventive system can be configured with a computer as a first computing device and a smart phone with a finger print sensor as a second computing device. The first computing device may want to access the user's private information through a website. The first synchronization signal from the first computing device can be the URL for a login page of the private information website. The URL can be mapped to a second synchronization signal that can be a finger print sensor prompt to the smart phone. As discussed, the mapping can be done by a synchronization server, or alternatively the first or second computing devices. The smart phone can respond to the second synchronization signal by displaying instructions for the user to touch the finger print sensor to complete the login of the user to the private information website on the first computing device. The user can then touch the finger print sensor and the second computing device can compare the input fingerprint to the stored finger print for the user. If there is a match, the second computing device will transmit a confirmation third synchronization signal to the first computing device and the user will be granted access to the private information through the website on the first computing device. Alternatively, if the fingerprint does not match, the second computing device can inform the user to try again or that the finger print is not a match and transmit the fingerprint mismatch message as the third synchronization signal to the first computing device.

This described finger print sensor system can be used for various other first computing device applications. For example, in an embodiment when a user first logs onto the first computing device, this login can be the first synchronization signal. The system can respond by transmitting the first synchronization signal to the second computing device that can be a smart phone that includes the finger print sensor. The smart phone can respond to the second synchronization signal by displaying instructions for the user to touch the fingerprint sensor to complete the login on the first computing device. If the smart phone confirms that the fingerprint is a match, it will send a print match confirmation as the third synchronization signal to the first computing device which will complete the user login on the first computing device (and possibly on the smart phone as well, if the developer chooses to map it as such). If the fingerprint sensor input does not match the stored fingerprint the second computing device can send a rejection signal to the first computing device to block the user login on the first computing device.

In other embodiments, the system may require information (such as a password, personal identification number "PIN" or any other security information) in addition to the fingerprint confirmation to complete the login process. Thus, the second computing device can transmit a fingerprint match confirmation and the user's PIN or login/password as the third synchronization signal to the first computing device. The first computing device can complete the login if the first computing device determines that the PIN information provided is also a match.

Figure 9:
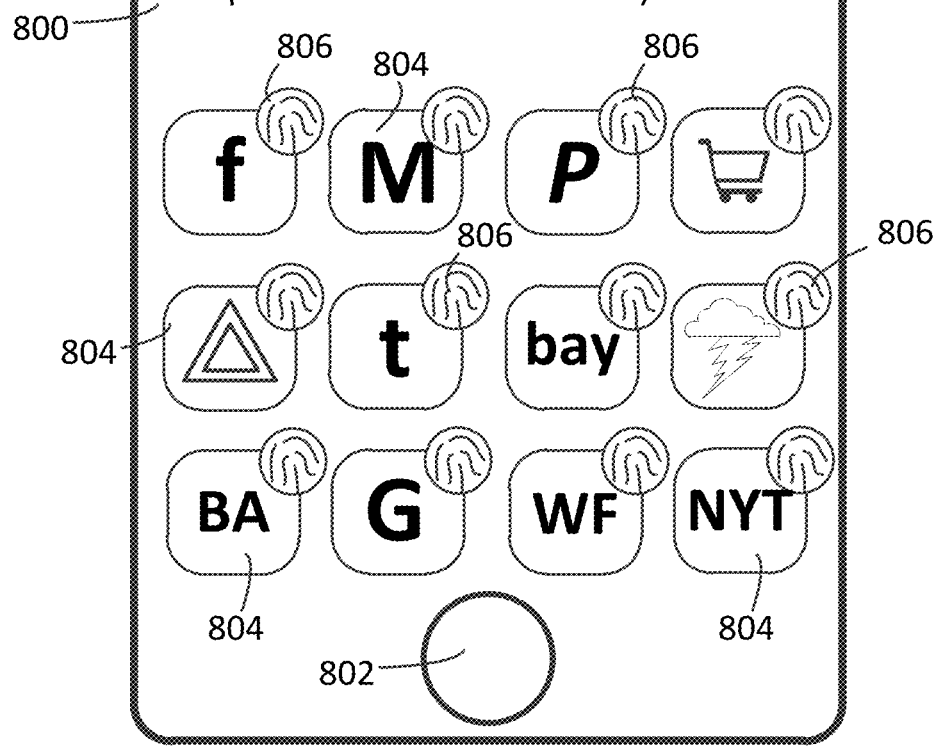
FIGS. 9-12 are screen shots of a user interface for a fingerprint login application, consistent with certain aspects related to the innovations herein.

In an embodiment, the finger print login functionality can be added to a user's computing device(s). A user may download a finger print login software application to a computing device that includes a fingerprint sensor. With reference to FIG. 9, an example of a user interface screen on a computing device 800 having a fingerprint sensor 802 and running the fingerprint login application is illustrated. The fingerprint login application can search the memory of the computing device 800 for applications and user login information for the applications. The login information can include for example, user names, passwords, fingerprint authentication or additional user data including but not limited to name, age, sex and location.

In an embodiment, the fingerprint login software can ask the user if he or she would like to apply the fingerprint login function to this website or the user may select the applications that he or she would like to apply the fingerprint feature to. The fingerprint login application can display some of the application icons 804 that can be converted to add the fingerprint login feature by displaying these icons 804 with a fingerprint icon 806 to indicate the compatibility of the fingerprint login feature; however it is fully-compatible with any website that uses a login/password combination to login. In this example, the user interface displays the message to the user, "Create Fingerprint Login" and "To login with you fingerprint, just visit any page & then sign in for the last time—accounts are securely encrypted enabling quick & safe access from any device." The user can then select the applications to apply the fingerprint login to.

Figure 10:
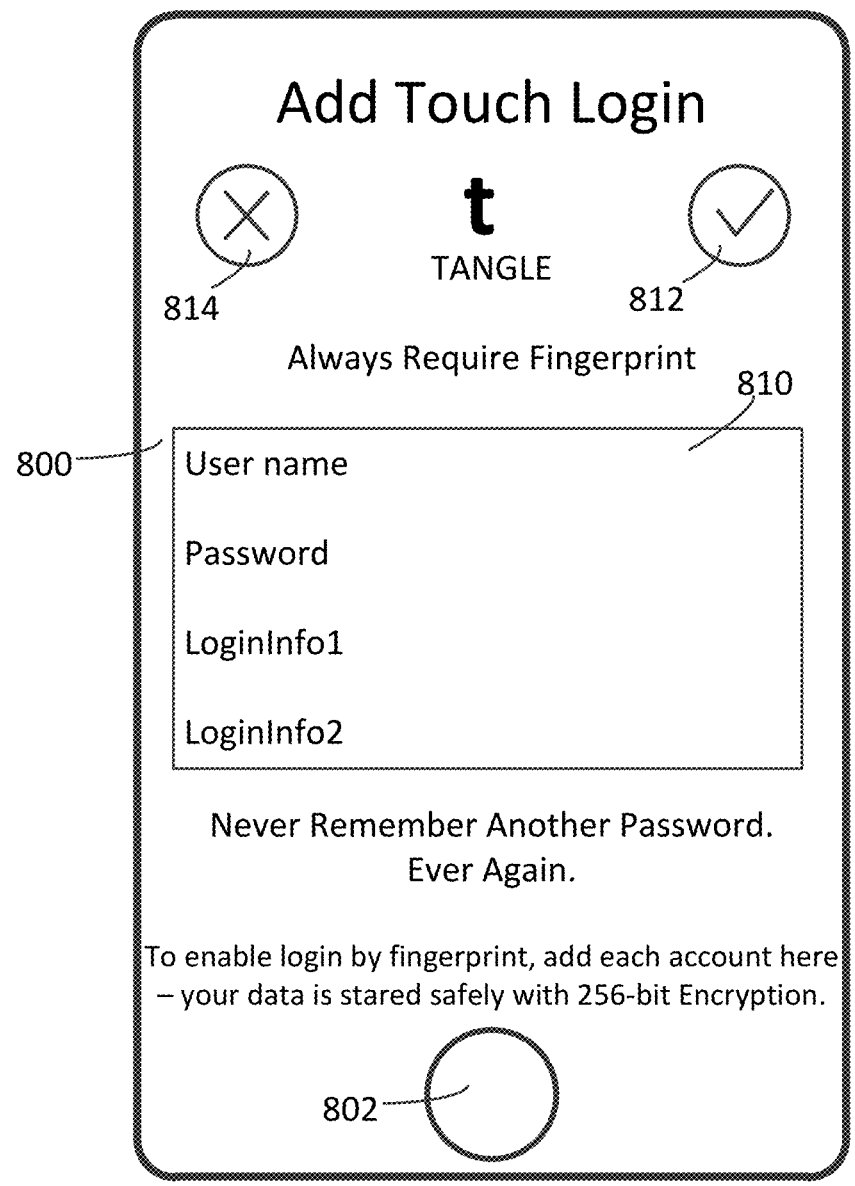

To activate the fingerprint login feature for an application, the user can click on the application for fingerprint login. The computing device can prominently display the application selected by the user and the login input information for the application can be displayed as illustrated in FIG. 10. In this example, the login fields include: Username, Password, LoginInfo1 and LoginInfo2 810. The user can input the user's identification information for each of these login fields 810 and then click the accept button 812 to enter these inputs and apply the fingerprint feature to the application. If the user decides not to use the fingerprint input, the user can click the cancel button 814.

Figure 11:
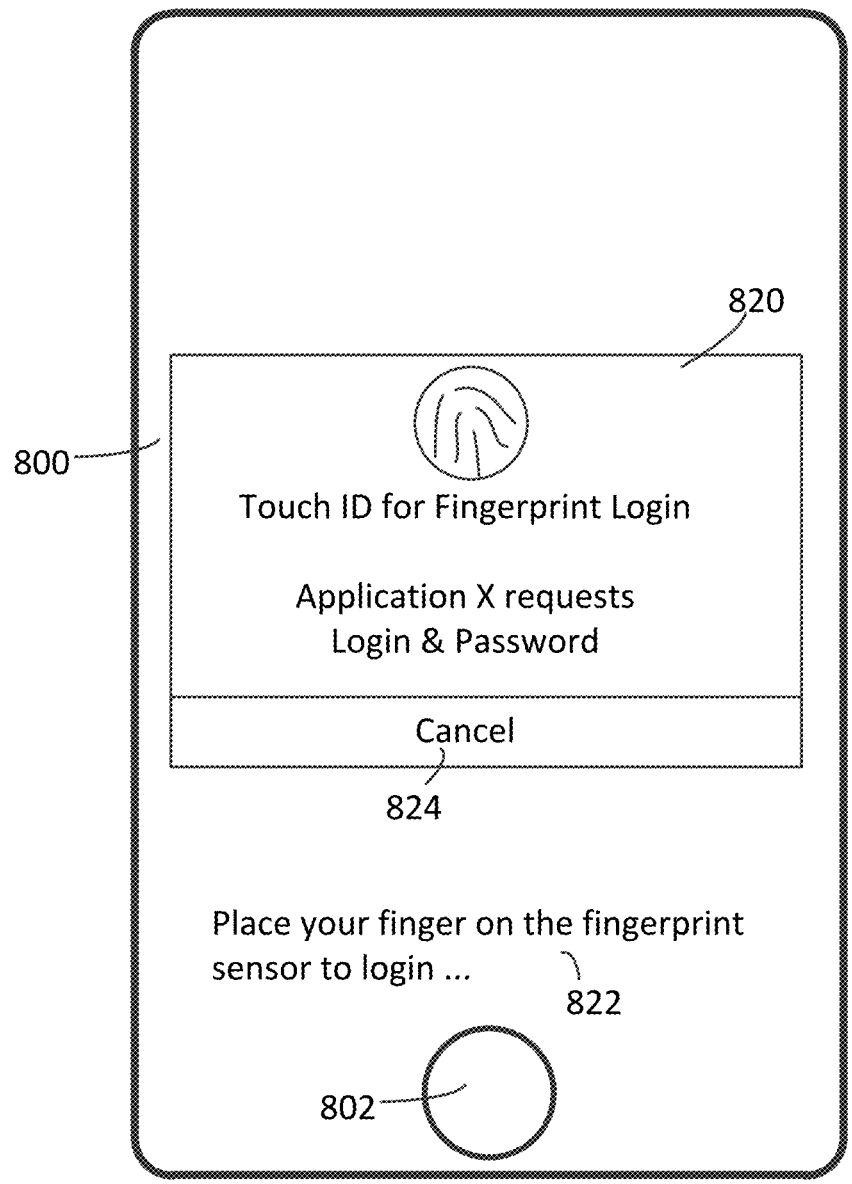

When the accept button 812 is pressed, the login application can then attempt to login to the application to confirm that the application login information and the user fingerprint correct. With reference to FIG. 11, the computing device 800 can go to the application login page and the fingerprint login application can inform the user that the application is requesting the login and password and that by touching the fingerprint sensor 802, this information will be used to login to the application. The user interface can also display instructions to place the user's finger on the fingerprint sensor to login 822. The user can respond by placing the finger on the fingerprint sensor 802 to login to the application. In an embodiment, for enhanced security, when the user is scanning their fingerprint, the front-facing camera is activated to take a photo of the user attempting to login. This photo may be sent as a sync signal or kept for security or additional authorization verification including but not limited to facial recognition. If the computing device confirms the fingerprint the user's login information is input by the app into the website's login field form and automatically submitted so the user will be able to use the application. If the website has integrated the site-wide sync script, the login information will be sent by the fingerprint app directly to the webserver (otherwise the fingerprint app will manually insert the login info into the website login form fields within the app). Alternatively, if the user decides not to use the fingerprint input, the user can click the cancel button 824. After logging in the fingerprint login application may not interfere with the user's interaction with the application.

Figure 12:
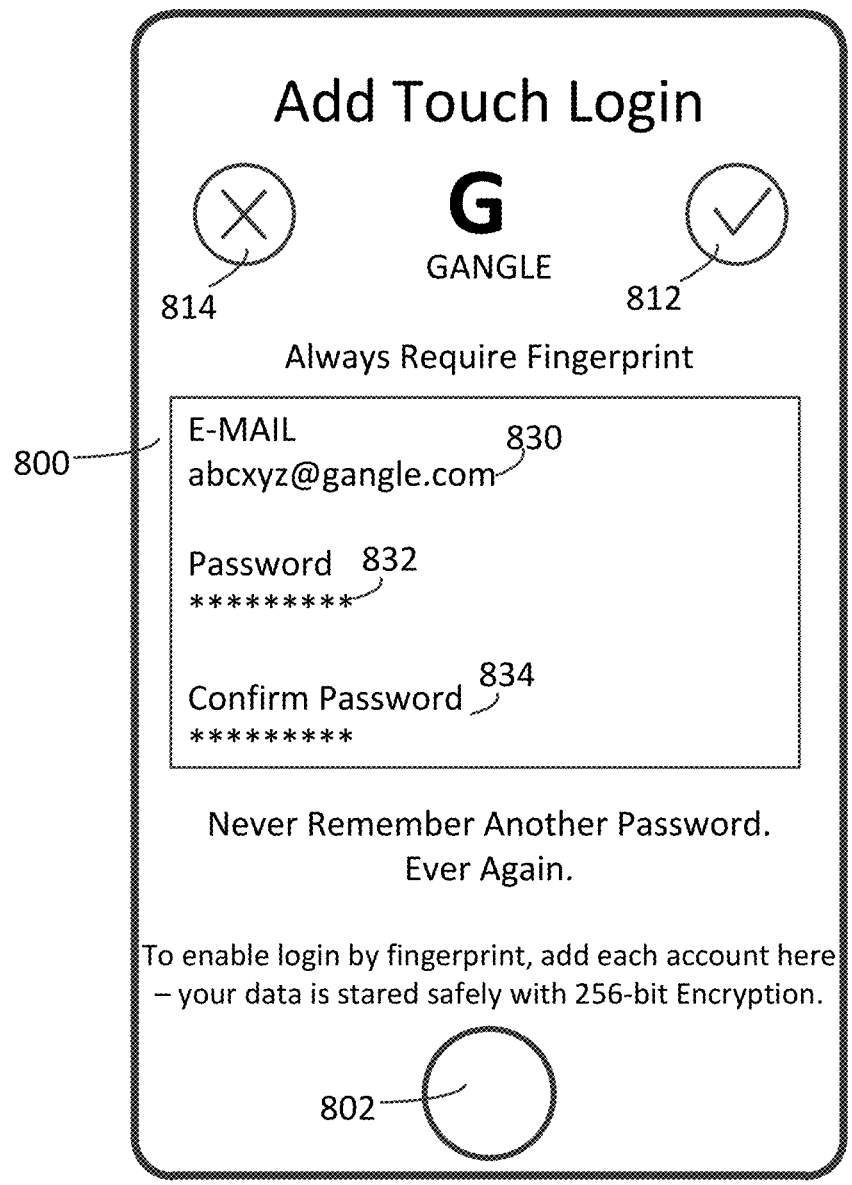

Once the first login is performed for the application using the fingerprint login application, the user's application login information can be stored locally on the device within the fingerprint application and when the user uses the application in the future, the only input required can be the fingerprint. It can be good practice for security reasons to change a user's login information periodically. When the login information is changed for an application the user can edit the login information saved by the fingerprint login application. In some cases, the user may update the login information for an application but fail to update the application login information in the fingerprint login application. If the user attempts to login to an application, and the user information fails, the fingerprint login application can detect this error and display a user interface asking the user to update the login information. With reference to FIG. 12, a user interface of the computing device 800 can display input fields for the user's edited login information. In this example, the user has input an email address abcxyz@gangle.com 830, a new password 832 and a new password confirmation 834. Once the edited login information is input, the user can click the accept button 812 to save the edited login inputs which will be applied when the fingerprint application is used for future logins. Alternatively, the user can click the cancel button 814 to not enter these changes.

Figure 13:
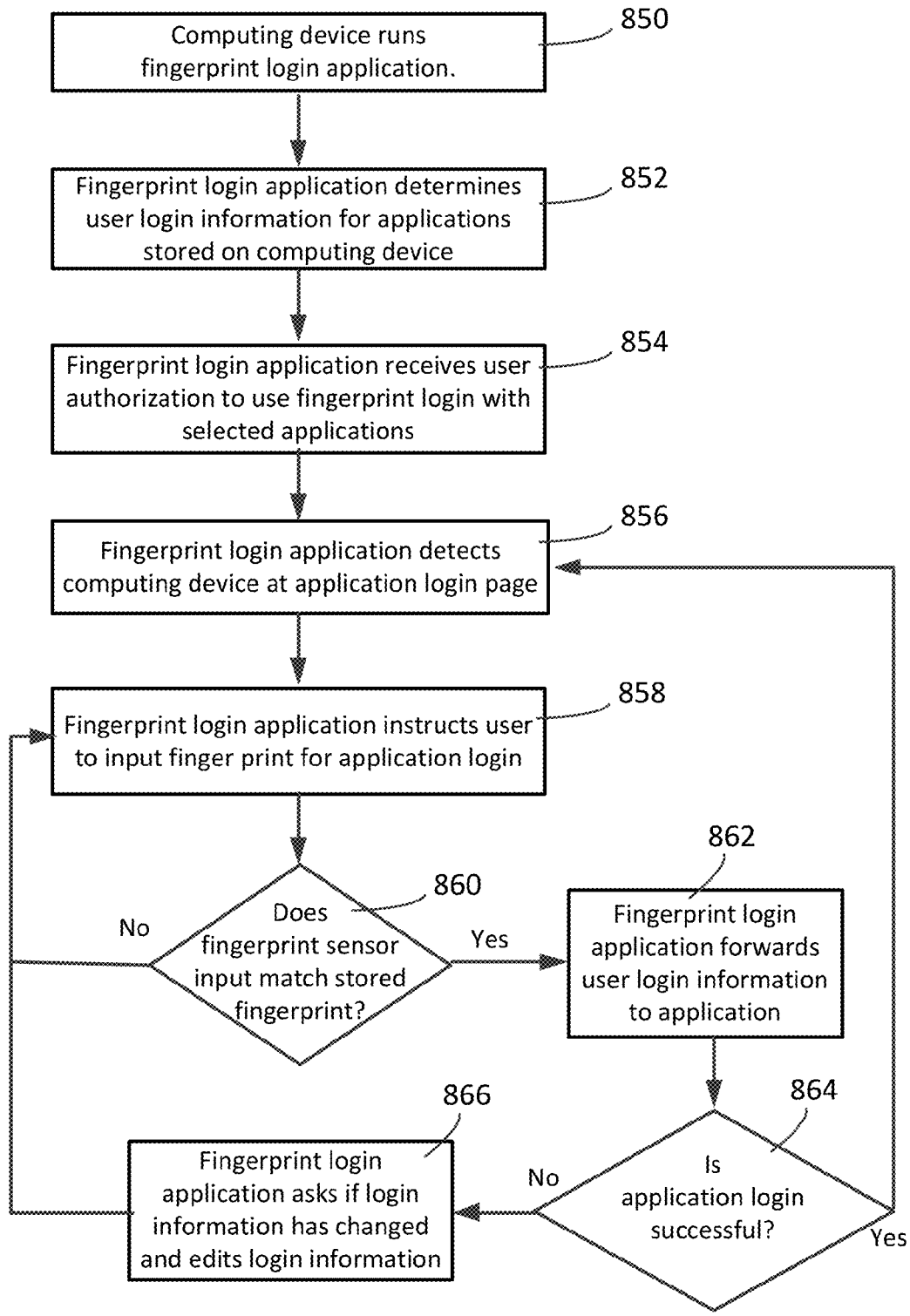
FIG. 13 is a flow diagram illustrating further exemplary fingerprint login application processing, consistent with certain aspects related to the innovations herein.

An embodiment of the fingerprint application functionality can be represented by the flowchart shown in FIG. 13. The fingerprint login application can run on a computing device 850. The fingerprint application can determine the user login information and corresponding applications stored on the computing device 852. The fingerprint login application can receive user authorization to use the fingerprint login feature for some or all applications that have login requirements. The fingerprint application can determine that the user is at a login page of a user authorized fingerprint login application 856. The fingerprint login application can display instructions for the user to touch the fingerprint sensor to input the user fingerprint 858. The computing device can store the user's true fingerprint and compare this to the fingerprint input to the sensor 860 and return a pass or fail signal to the fingerprint login application. If the fingerprint is not a match, the fingerprint login application can go back and ask the user to input the fingerprint again 585. If the fingerprint is a match, the fingerprint login application can forward the stored user login information to the login field form of the application 862. The fingerprint login application can then determine if the application login was successful 864. If the login was successful, the fingerprint login application can wait for the computing device to go to an authorized application login page 856 to repeat the described process. If the fingerprint sensor input was correct but the login information was not accepted, the fingerprint login application can ask the user if the application login information has changed. If the login information has changed, the user can edit the login information for the fingerprint login application 866 and the system can go back and ask the user to input the fingerprint again 585.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. In a synchronization server, a method for synchronizing content between a first computing device and a second computing device, the method comprising:
receiving a first synchronization signal from the first computing device that is based on a triggering event in the first computing device;
mapping the first synchronization signal to a second synchronization signal based on mapping information in the synchronization server, wherein the second synchronization signal includes information not represented by the first synchronization signal; and
transmitting the second synchronization signal to the second computing device for processing.

2. The method of claim 1 further comprising:
receiving a synchronization trigger signal from the first computing device before transmitting the second synchronization signal to the second computing device.

3. The method of claim 2, wherein the synchronization trigger signal results from a synchronization button being activated on a user interface on the first computing device.

4. The method of claim 1, wherein the second synchronization signal is sent to a synchronization application running on the second computing device.

5. The method of claim 1 further comprising:
receiving a third synchronization signal from the second computing device corresponding to a user input to the second computing device;
mapping the third synchronization signal to a fourth synchronization signal based on the information in the synchronization server; and
transmitting the fourth synchronization signal.

6. The method of claim 1 wherein the first synchronization signal includes a link to a first resource and the second synchronization signal includes a link to a mobile resource.

7. The method of claim 1 wherein processing the second synchronization signal in the second computing device results in the second computing device obtaining a web page from a web server that includes a login request.

8. The method of claim 7, wherein the second computing device detects a fingerprint pattern with a fingerprint sensor on the second computing device; and wherein the second computing device sends a fingerprint match confirmation signal to indicate a result of processing the detected fingerprint pattern.

9. The method of claim 8, wherein the second computing device further transmits to the first computing device login information responsive to the login request.

10. The method of claim 1 wherein, in response to the second synchronization signal, the second computing device provides a resource identifier for an application download website.

11. In a system including a first computing device and a second computing device, a method in the second computing device for synchronizing content between the first and second computing devices, comprising:
running a synchronization application;
receiving a first synchronization signal from the first computing device that is based on a trigger event in the first computing device;
in the synchronization application, mapping the first synchronization signal to a second synchronization signal based on information in the synchronization application, wherein the second synchronization signal includes information not represented by the first synchronization signal; and
processing the second synchronization signal.

12. The method of claim 11, wherein the first computing device transmits the first synchronization signal to the second computing device in response to receiving a synchronization trigger signal.

13. The method of claim 11, wherein the synchronization trigger signal results from a synchronization button being activated on a user interface on the first computing device.

14. The method of claim 11 further comprising:
transmitting, from the synchronization application, a third synchronization signal to the first computing device.

15. The method of claim 11 wherein the first synchronization signal includes a link to a first resource and the second synchronization signal includes a link to a mobile resource.

16. The method of claim 11 wherein processing the second synchronization signal comprises obtaining a web page that includes a login request.

17. The method of claim 16 further comprising:
detecting a fingerprint pattern with a fingerprint sensor;
processing the detected fingerprint pattern; and
sending to the first computing device a fingerprint match confirmation signal to indicate a result of processing the detected fingerprint pattern.

18. The method of claim 17 further comprising:
transmitting login information responsive to the login request to the first computing device.

19. The method of claim 11 wherein the first synchronization signal includes location information and wherein, in response to the second synchronization signal, the second computing device provides directions from a current location of the second computing device to a location associated with the location information.

20. The method of claim 11 further comprising:
receiving the mapping information into the synchronization application prior to mapping the first synchronization signal.

21. The method of claim 1, wherein the triggering event comprises detection of one or more of: predetermined content, a sensor signal, a user action, access to a peripheral device, and execution of predetermined program instructions.

22. The method of claim 21, wherein the predetermined content comprises a web page served by a predetermined server for processing in the first computing device.

23. The method of claim 22, wherein the predetermined server comprises a synchronization-enabled web server.

24. The method of claim 22, wherein the predetermined server provides one or more of: an information service, a user authentication service ("login service"), and a mobile application provisioning service ("app store").

25. The method of claim 21, wherein the sensor signal comprises a signal generated by one or more of: a positioning system, a navigation system receiver, an image processing device, a network activity, and a communication module in the first computing device.

26. The method of claim 21, wherein the peripheral device comprises one or more of: a display panel, a storage system, and a data communication device.

27. The method of claim 21, wherein the predetermined program instructions comprise one or more of: a browser plug-in or extension and a client-site script executing in a web browser and a service program running in the background.

28. The method of claim 21, wherein the user action comprises the user actuating asynchronization button on a user interface that causes the first synchronization trigger signal to be activated in the first computing device.

29. The method of claim 21, wherein the user action comprises a specific change in cursor position, a mouse click or a selection of a specific tab in a user interface of a web browser.

30. The method of claim 1, wherein the synchronization comprises a synchronization application running on the first computing device or the second computing device.

31. The method of claim 1, further comprising detecting if the second computing device is on-line and wherein, if the second computing device is not on-line, sending the second synchronization signal using a push mechanism.

32. The method of claim 31 wherein, when the second computing device comes on-line, receiving the first synchronization signal from a push server.

33. The method of claim 1, wherein the first synchronization signal is generated from a web browser extension in the first computing device.

34. The method of claim 1, wherein the second synchronization signal is processed by a web browser extension in the second computing device.

35. The method of claim 11, wherein the synchronization application comprises a web browser extension.

36. The method of claim 11, wherein the triggering event comprises detection of one or more of: predetermined content, a sensor signal, a user action, access to a peripheral device, and execution of predetermined program instructions.

37. The method of claim 36, wherein the predetermined content comprises a web page served by a predetermined server for processing in the first computing device.

38. The method of claim 37, wherein the predetermined server comprises a synchronization-enabled web server.

39. The method of claim 37, wherein the predetermined server provides one or more of: an information service, a user authentication service ("login service"), and a mobile application provisioning service ("app store").

40. The method of claim 36, wherein the sensor signal comprises a signal generated by one or more of: a positioning system, a navigation system receiver, an image processing device, a network activity, and a communication module in the first computing device.

41. The method of claim 36, wherein the peripheral device comprises one or more of: a display panel, a storage system, and a data communication device.

42. The method of claim 36, wherein the predetermined program instructions comprise one or more of: a browser plug-in or extension and a client-site script executing in a web browser and a service program running in the background.

43. The method of claim 36, wherein the user action comprises the user actuating a synchronization button on a user interface that causes the first synchronization trigger signal to be activated in the first computing device.

44. The method of claim 36, wherein the user action comprises a specific change in cursor position, a mouse click or a selection of a specific tab in a user interface of a web browser.

45. The method of claim 11, further comprising detecting if the second computing device is on-line and wherein, if the second computing device is not on-line, sending the second synchronization signal using a push mechanism.

46. The method of claim 11, wherein the first synchronization signal is generated from a web browser extension in the first computing device.

47. The method of claim 11, wherein the second synchronization signal is processed by a web browser extension in the second computing device.

48. The method of claim 11 wherein, when the second computing device comes on-line, receiving the first synchronization signal from a push server.

49. The method of claim 11, wherein the synchronization application comprises a web browser extension.

50. A synchronization server synchronizing content between a first computing device and a second computing device, the synchronizing server comprising:
a network interface; and
a database including information mapping between a first synchronization signal of the first computing device and a second synchronization signal of the second computing device, wherein the second synchronization signal includes information not represented by the first synchronization signal, and wherein the synchronization server is configured to (i) receive over the network interface the first synchronization signal from the first computing device in conjunction with a triggering event in the first computing device, (ii) retrieve the second synchronization signal from the database, and (iii) transmits over the network interface the second synchronization signal to the second computing device for processing.

51. The synchronization server of claim 50, wherein the synchronization server is further configured to receive a synchronization trigger signal from the first computing device before transmitting the second synchronization signal to the second computing device.

52. The synchronization server of claim 51, wherein the synchronization trigger signal results from actuating a synchronization button on a user interface on the first computing device.

53. The synchronization server of claim 50, wherein the second synchronization signal is sent to a synchronization application running on the first computing device or the second computing device.

54. The synchronization server of claim 50, wherein the synchronization server is further configured to (i) receive over the network interface a third synchronization signal from the second computing device corresponding to a user input to the second computing device; (ii) use the database to map the third synchronization signal to a fourth synchronization signal based on the information in the synchronization server; and (iii) transmit over the network interface the fourth synchronization signal.

55. The synchronization server of claim 50 wherein the first synchronization signal includes a link to a first resource and the second synchronization signal includes a link to a mobile resource.

56. The synchronization server of claim 50 wherein processing the second synchronization signal in the second computing device results in the second computing device obtaining a web page from a web server that includes a login request.

57. The synchronization server of claim 56, wherein the web server comprises a synchronization-enabled web server.

58. The synchronization server of claim 56, wherein the second computing device detects a fingerprint pattern with a fingerprint sensor on the second computing device; and wherein the second computing device sends a fingerprint match confirmation signal to indicate a result of processing the detected fingerprint pattern.

59. The synchronization server of claim 50 wherein, in response to the second synchronization signal, the second computing device provides a resource identifier for an application download website.

60. The synchronization server of claim 50, wherein the triggering event comprises detection of one or more of: predetermined content, a sensor signal, a user action, access to a peripheral device, and execution of predetermined program instructions.

61. The synchronization server of claim 60, wherein the predetermined content comprises a web page served by a predetermined server for processing in the first computing device.

62. The synchronization server of claim 61, wherein the predetermined server comprises a synchronization-enabled web server.

63. The synchronization server of claim 61, wherein the predetermined server provides one or more of: an information service, a user authentication service ("login service"), and a mobile application provisioning service ("app store").

64. The synchronization server of claim 60, wherein the sensor signal comprises a signal generated by one or more of: a positioning system, a navigation system receiver, an image processing device, a network activity, and a communication module in the first computing device.

65. The synchronization server of claim 60, wherein the peripheral device comprises one or more of: a display panel, a storage system, and a data communication device.

66. The synchronization server of claim 60, wherein the predetermined program instructions comprise one or more of: a browser plug-in or extension and a client-site script executing in a web browser and a service program running in the background.

67. The synchronization server of claim 60, wherein the user action comprises the user actuating asynchronization button on a user interface that causes the first synchronization trigger signal to be activated in the first computing device.

68. The synchronization server of claim 60, wherein the user action comprises a specific change in cursor position, a mouse click or a selection of a specific tab in a user interface of a web browser.

69. The synchronization server of claim 50, wherein the synchronization server is further configured to (i) detect if the second computing device is on-line and (ii) when the second computing device is not on-line, send the second synchronization signal using a push mechanism.

70. The synchronization server of claim 50, wherein the first synchronization signal is generated from a web browser extension in the first computing device.

71. The synchronization server of claim 50, wherein the second synchronization signal is processed by a web browser extension in the second computing device.

72. The synchronization server of claim 50, wherein the synchronization server comprises a synchronization application running on the first computing device or the second computing device and wherein the network interface is a virtual network interface.

73. In a system comprising a first computing device and a second computing device, wherein the second computing device synchronizes content between itself and the first computing devices, the second computing device comprising: (a) a network interface for receiving a first synchronization signal from the first computing device in conjunction with a triggering event; and (b) a synchronization application which (i) maps the first synchronization signal to a second synchronization signal based on information in the synchronization application, wherein the second synchronization signal includes information not represented by the first synchronization signal; and (ii) processes the second synchronization signal.

74. The second computing device of claim 73, wherein the first computing device transmits the first synchronization signal to the second computing device in response to receiving a synchronization trigger signal.

75. The second computing device of claim 73, wherein the synchronization trigger signal results from actuating a synchronization button on a user interface on the first computing device.

76. The second computing device of claim 73 wherein the synchronization application is further configured to send a third synchronization signal to the first computing device.

77. The second computing device of claim 73, wherein the first synchronization signal includes a link to a first resource and the second synchronization signal includes a link to a mobile resource.

78. The second computing device method of claim 64 wherein the second synchronization signal is processed by obtaining a web page from a web server that includes a login request.

79. The second computing device of claim 78, wherein the web server comprises a synchronization-enabled web server.

80. The second computing device of claim 78, further comprising a fingerprint sensor that detects a finger print pattern, wherein the synchronization application processes the detected fingerprint pattern; and sends to the first computing device a fingerprint match confirmation signal to indicate a result of processing the detected fingerprint pattern.

81. The second computing device of claim 80, wherein the synchronization application is further configured to transmit login information responsive to the login request to the first computing device.

82. The second computing device of claim 73, wherein the first synchronization signal includes location information and wherein, in response to the second synchronization signal, the second computing device provides directions from a current location of the second computing device to a location associated with the location information.

83. The second computing device of claim 73, wherein the synchronization application is further configured to receive the mapping information prior to mapping the first synchronization signal.

84. The second computing device of claim 73 wherein the second computing device is configured to, when it comes on-line, receive the first synchronization signal from a push server.

85. The second computing device of claim 73, wherein the synchronization application comprises a web browser extension.

86. The second computing device of claim 73, wherein the triggering event comprises detection of one or more of: predetermined content, a sensor signal, a user action, access to a peripheral device, and execution of predetermined program instructions.

87. The second computing device of claim 86, wherein the predetermined content comprises a web page served by a predetermined server for processing in the first computing device.

88. The second computing device of claim 87, wherein the predetermined server comprises a synchronization-enabled web server.

89. The second computing device of claim 86, wherein the predetermined server provides one or more of: an information service, a user authentication service ("login service"), and a mobile application provisioning service ("app store").

90. The second computing device of claim 86, wherein the sensor signal comprises a signal generated by one or more of: a positioning system, a navigation system receiver, an image processing device, a network activity, and a communication module in the first computing device.

91. The second computing device of claim 86, wherein the peripheral device comprises one or more of a display panel, a storage system, and a data communication device.

92. The second computing device of claim 86, wherein the predetermined program instructions comprise one or more of: a browser plug-in or extension and a client-site script executing in a web browser and a service program running in the background.

93. The second computing device of claim 21, wherein the user action comprises the user actuating asynchronization button on a user interface that causes the first synchronization trigger signal to be activated in the first computing device.

94. The second computing device of claim 86, wherein the user action comprises a specific change in cursor position, a mouse click or a selection of a specific tab in a user interface of a web browser.

95. The method of claim 1, wherein processing the second synchronization signal at the second computing device comprising accessing a display device or a storage device.

96. The method of claim 11, wherein processing the second synchronization signal at the second computing device comprising accessing a display device or a storage device.

97. The synchronization server of claim 50, wherein processing the second synchronization signal at the second computing device comprising accessing a display device or a storage device.

98. The second computing device of claim 73, wherein processing the second synchronization signal at the second computing device comprising accessing a display device or a storage device.

99. The method of claim 1, wherein processing the second synchronization signal at the second computing device comprising causing data to be transferred from the second computing device.

100. The method of claim 11, wherein processing the second synchronization signal at the second computing device comprising causing data to be transferred from the second computing device.

101. The synchronization server of claim 50, wherein processing the second synchronization signal at the second computing device comprising causing data to be transferred from the second computing device.

102. The second computing device of claim 73, wherein processing the second synchronization signal at the second computing device comprising causing data to be transferred from the second computing device.

* * * * *